United States Patent [19]
Nasu et al.

[11] Patent Number: 5,671,402
[45] Date of Patent: Sep. 23, 1997

[54] METHOD OF EVALUATING A DATA PROCESSING RATE USING SIMULATION

[75] Inventors: Takashi Nasu; Tadashi Sakamoto, both of Hyogo, Japan

[73] Assignee: Mitsubishi Denki Kabushiki Kaisha, Tokyo, Japan

[21] Appl. No.: 411,981

[22] Filed: Mar. 28, 1995

[30]     Foreign Application Priority Data

Apr. 12, 1994 [JP] Japan .................................. 6-073130
Jan. 6, 1995 [JP] Japan .................................. 7-000675

[51] Int. Cl.$^6$ .................................................. G06F 9/455
[52] U.S. Cl. ...................... 395/568; 395/500; 395/184.01
[58] Field of Search .................................. 395/568, 500, 395/800, 183.04, 184.01

[56]     References Cited

U.S. PATENT DOCUMENTS

| | | | |
|---|---|---|---|
| 5,303,166 | 4/1994 | Amalfitano et al. .................. | 364/551.01 |
| 5,347,647 | 9/1994 | Allt et al. ........................... | 395/183.04 |
| 5,485,574 | 1/1996 | Bolosky et al. .................... | 395/183.11 |
| 5,488,713 | 1/1996 | Norton et al. ....................... | 395/500 |
| 5,517,629 | 5/1996 | Boland ................................ | 395/183.14 |

*Primary Examiner*—Parshotam S. Lall
*Assistant Examiner*—Viet Vu
*Attorney, Agent, or Firm*—Oblon, Spivak, McClelland, Maier & Neustadt, P.C.

[57]     ABSTRACT

Correct and accurate evaluation as to which portion of a program to be subjected to rate performance evaluation takes much time is disclosed. Program counters (101c, 101d) hold instructions in simulation of a simulation engine (101). An instruction execution count and a cumulative clock cycle count required for the execution are arranged for the same instruction and stored in an execution count storage array (102b) and a cumulative clock cycle count storage array (102c), respectively. The execution count of the same instruction and the cumulative time required for the execution thereof are determined.

13 Claims, 19 Drawing Sheets

METHOD OF EVALUATING A DATA PROCESSING RATE USING SIMULATION

BACKGROUND OF THE INVENTION

1. Field of the Invention

The present invention relates to rate performance i.e., in which portion of a program a data processor spends its time.

2. Description of the Background Art

FIG. 17 illustrates a benchmark program 30 generally used as a method of evaluating a data processing rate. The benchmark program 30 comprises a program 32 to be subjected to a benchmark test, a function 31 for deriving a start time of the program 32, and a function for deriving an end time of the program 32.

When executing the benchmark program 30, the time it takes to execute the program 32 is determined by obtaining the difference between the start time provided by the function 31 and the end time provided by the function 33. The performance of the data processing rate is evaluated by the time it takes to execute the program 32.

For evaluation as to which portion of the benchmark program 30 requires a longer execution time, the program 32 has been fragmented. FIG. 18 illustrates a benchmark program 30a comprising programs 32a to 32c to be subjected to the benchmark test by fragmenting the program 32.

Functions 31a to 31c for deriving the start time and functions 33a to 33c for deriving the end time are provided respectively in association with the programs 32a to 32c for determining the time required to execute the programs 32a to 32c.

Such a method of evaluating the rate performance in which the functions for deriving the execution start and end times called requires the fragmentation of the program to be subjected to the benchmark test for evaluation as to which portion of the program to be subjected to the benchmark test takes much execution time and the determination of the execution time required for the fragmented programs. On the other hand, further fragmentation has prevented correct evaluation due to overhead for calling the time deriving functions. Furthermore, the evaluation exceeding the accuracy of the time deriving functions is impracticable.

FIG. 19 notionally illustrates another method of evaluating the data processing rate of the background art. During the execution of a program 35 to be subjected to the rate performance evaluation, periodic interrupts cause a sampling program 34 to start. The arrows of FIG. 19 indicate the start of the sampling program 34 by the periodic interrupts. The sampling program 34 samples the address of an instruction executed by the program 35 to be subjected to the rate performance evaluation.

For example, Japanese Patent Application Laid-Open No. 1-145736 (1989) discloses an evaluation technique which specifies a sampling interval and a measurement frequency to simulate an execution state during the sampling time period by using timer interrupts.

The periodicity of the interrupts allows evaluation as to which portion of the program takes much execution time from the addresses of a plurality of sampled instructions. Unlike the method described with reference to FIGS. 17 and 18, this method is not required to call the functions for deriving the measurement start and end times of the execution time.

However, such a method of evaluating the rate performance by using the periodic interrupts involves the need to make the sampling intervals wide enough to neglect the overhead required to start an interrupt program, resulting in difficulties in performing correct evaluation at closer sampling intervals.

As above stated, the methods of evaluating the data processing rate described with reference to FIGS. 17 to 19 have been disadvantageous in that detailed evaluation is not carried out due to the overhead resulting from the function calls and interrupts.

Japanese Patent Application Laid-Open No. 2-31248 (1990) discloses a method of measuring a processing performance of only instructions associated with preset specific addresses by determining the execution time and execution count of the instructions by using a counter provided in association with the specific address when the address of the executed instruction coincides with the specific address.

This method provides information about the execution count and execution time within a preset address range but evaluates only the total execution time within the preset address range. For example, if a loop within the preset address range is repeatedly executed, it is impossible to obtain the execution time required only for the execution of the loop. Further, a portion measured by one execution of the program is limited by the number of counters provided.

SUMMARY OF THE INVENTION

The present invention is directed to a method of evaluating a data processing rate, wherein a rate at which a program to be subjected to a rate performance evaluation is executed in a data processor operating in response to a clock is evaluated by means of simulation, the program including a plurality of instructions. According to the present invention, the method comprises the steps of: (I) performing a first type simulation, the step (I) including the steps of (a) performing the simulation of operation of the data processor for executing the program in response to a simulated clock for simulating the clock, and (b) holding an execution count and a clock cycle count of the simulated clock required for the execution of each of the instructions in the simulation at an address corresponding to each of the instructions, the step (a) including the steps of: (a-1) holding a first one of the instructions executed in the simulation and a second one of the instructions succeeding the first instruction in the program when the second instruction is executed in the simulation after the execution of the first instruction is terminated; and (a-2) updating the first and second instructions held in the step (a-1) by updating and executing an instruction of the program in the simulation, the step (b) including the steps of: (b-1) incrementing by one the execution count held in association with an address corresponding to the first instruction held in the step (a-1) each time the execution of the first instruction is terminated; and (b-2) cumulatively adding a clock cycle count required for execution of the first instruction in the simulation to the clock cycle count held in association with an address corresponding to the first instruction held in the step (a-1) each time the execution of the first instruction is terminated, the step (a) further including the step of: (a-3) replacing the first instruction held in the step (a-1) with the second instruction after the steps (b-1) and (b-2).

In the method of the present invention, the clock cycle count required for instruction execution and the execution count in the simulation are cumulatively added at an address corresponding to each instruction.

According to the method of the present invention, the execution count and the clock cycle count required for the execution in the simulation of the operation of the data processor are cumulatively held for each instruction of the program to be subjected to rate performance evaluation. Only one execution of the program allows the rate of execution to be evaluated for each instruction of the program without fragmentation of the program.

Preferably, the step (b) further includes the steps of: (b-3) generating the simulated clock in the simulation; (b-4) counting the simulated clock to determine a clock cycle count required for execution of the first instruction; and (b-5) resetting the clock cycle count counted in the step (b-4) after the step (b-2).

In this method, the simulated clock is simulatively generated and counted to determine the clock cycle count.

Since the simulated clock is simulatively generated when the data processor is simulated, counting of the simulated clock provides the cumulative clock cycle count required for instruction execution.

Preferably, the plurality of instructions form a subprogram in the program, and the first type simulation step (I) further includes the steps of: (c) determining a clock cycle count required for execution of each of the instructions forming the subprogram in the simulation on the basis of the steps (a) and (b); (d) determining an execution count of the subprogram in the simulation; (e) calculating the sum of clock cycle counts required for execution of the instructions forming the subprogram in the simulation; and (f) dividing the sum calculated in the step (e) by the execution count determined in the step (d) to determine an average clock cycle count required for execution of at least one of the instructions forming the subprogram in the simulation.

In this method is determined the sum of clock cycle counts required for simulative execution of the instructions forming the subprogram which is divided by the execution count, providing the average clock cycle count required for execution of at least one instruction forming the subprogram in simulation.

The average clock cycle count required for execution of at least one instruction forming the subprogram in simulation is determined to evaluate the average rate of execution.

Preferably, the subprogram is a basic block to be performed continuously from its first instruction to its last instruction in execution, and the step (e) includes the step of (e-1) determining an execution count of the basic block in the simulation from an execution count of any one of the instructions forming the basic block in the simulation.

Since the subprogram is the basic block, the execution count of the basic blocks in the simulation is determined as the execution count of any one of the instructions forming the basic block in the simulation.

Preferably, a clock cycle count required for execution of at least one of the instructions in an ideal state is known as an ideal clock cycle count, and the first type simulation step (I) further includes the steps of: (c) determining an execution count of an instruction for which the ideal clock cycle count is known in the simulation from the steps (a) and (b); (d) determining a clock cycle count required for execution of the instruction for which the ideal clock cycle count is known in the simulation from the steps (a) and (b); (e) multiplying the ideal clock cycle count by the execution count determined in the step (c) to determine an ideal execution clock cycle count; and (f) comparing the clock cycle count determined in the step (d) with the ideal execution clock cycle count.

In this method, the ideal execution clock cycle count provided by multiplying the ideal clock cycle count by the execution count is compared with the clock cycle count practically required for simulative execution.

The step of comparing the cumulative clock cycle count for instruction execution in the practical simulation with that in the ideal case permits the judgement as to whether or not an excess number of clocks are required in program execution from the viewpoint of the construction of the data processor to evaluate the program rate performance.

The above-mentioned method provides means for examining optimization in a programming language processing system.

Preferably, the method further comprises the steps of: (II) performing a second type simulation for virtually implementing an internal state of the data processor after the execution of each of the instructions; and (III) performing control for continuously simulating a state in which the program is executed in the data processor selectively by one of the first type simulation step and the second type simulation step, wherein a storage area for use in the first type simulation step and the second type simulation step is shared therebetween.

In this method, the first type simulation step for correctly evaluating the processing rate and the second type simulation step for rapid simulation are exclusively executed depending upon conditions.

Preferably, the control step (III) includes the steps of: (c) recognizing one of the instructions which is to be simulated next to one of the instructions which is being simulated; and (d) selectively performing one of the first type simulation step (I) and the second type simulation step (II) in response to the recognized instruction.

In this method is judged which one of the first and second type simulation steps is used for any instruction to execute the simulation.

Preferably, the instruction to be simulated next to the instruction being simulated is stored in an array in each of the first type simulation step (I) and the second type simulation step (II).

The address of the instruction required to judge the switching between the first and second type simulation steps is stored in the first and second type simulation steps.

For simulation, the first type simulation step is employed for the instruction requiring correct rate evaluation while the second type simulation step is employed for the instruction requiring rapid simulation. This allows rapid and correct evaluation.

Preferably, the data processor includes (x-1) a visible register with which the program is permitted to be directly associated, and (x-2) an invisible register with which the program is not permitted to be directly associated; the first type simulation step (I) further includes the steps of (c) holding contents of the visible register, and (d) holding contents of the invisible register; the second type simulation step (II) includes the step of (e) holding the contents of the visible register; and the control step (III) includes the step of (f) resetting the contents held in the step (d) of the first type simulation step (I) when the operation of the data processor is simulated by the first type simulation step (I) in response to one of the instructions after the operation of the data processor is simulated by the second type simulation step (II) in response to another one of the instructions.

In this method, the contents of the invisible register are reset in the step (f). This prevents malfunctions in the first type simulation step when the switching is done from the second type simulation step to the first type simulation step for simulation.

Preferably, the control step (III) includes the steps of: (c) causing a first type command entered immediately after an interrupt of the simulation to perform the first type simulation step (I) upon an instruction to be simulated after the interrupt of the simulation; and (d) causing a second type command entered immediately after an interrupt of the simulation to perform the second type simulation step (II) upon an instruction to be simulated after the interrupt of the simulation.

The command entered during an interrupt judges which one of the first and second type simulation steps is used for simulation.

This enables the command entry to carry out the switching between the first type simulation step and the second type simulation step for simulation.

Preferably, the plurality of instructions are classified into a specific instruction and an unspecified instruction, and the control step (III) includes the steps of: (c) performing the first type simulation step (I) upon the unspecified instruction and (d) performing the second type simulation step (II) upon the specific instruction.

The specific instruction which is the instruction for execution of the second type simulation is previously provided in the program to be subjected to rate performance evaluation.

Preferably, the plurality of instructions further include first and second virtual system calls, and the control step (III) includes the steps of: (c) performing the first type simulation step (I) upon at least one of the instructions which is located between the first and second virtual system calls; and (d) performing the second type simulation step (II) upon at least one of the instructions which is located on the opposite side of the first virtual system call from the second virtual system call and at least one of the instructions which is located on the opposite side of the second virtual system call from the first virtual system call.

The second type simulation is performed only upon the instruction between the virtual system calls.

The simulation in the second type simulation step is performed upon the previously specified instruction while the simulation in the first type simulation step is performed upon other instructions.

The above described method determines the cumulative sum of the cumulative clock cycle counts required for instruction execution for each address at which a program instruction is located, each basic block and each program such as a function and procedure to evaluate the rate performance of the program. This provides for correct and high-speed determination of the cumulative clock cycle count required for execution of a portion to be evaluated in the program, efficiently tuning the program.

It is an object of the present invention to perform correct evaluation as to which portion of a program to be subjected to rate performance evaluation requires much time with only one execution of the program without fragmentation of the program.

It is another object of the present invention to perform evaluation that uses separate simulation methods switched between a portion of a program to be subjected to rate performance evaluation which requires correct evaluation and other portions thereof for high-speed processing.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
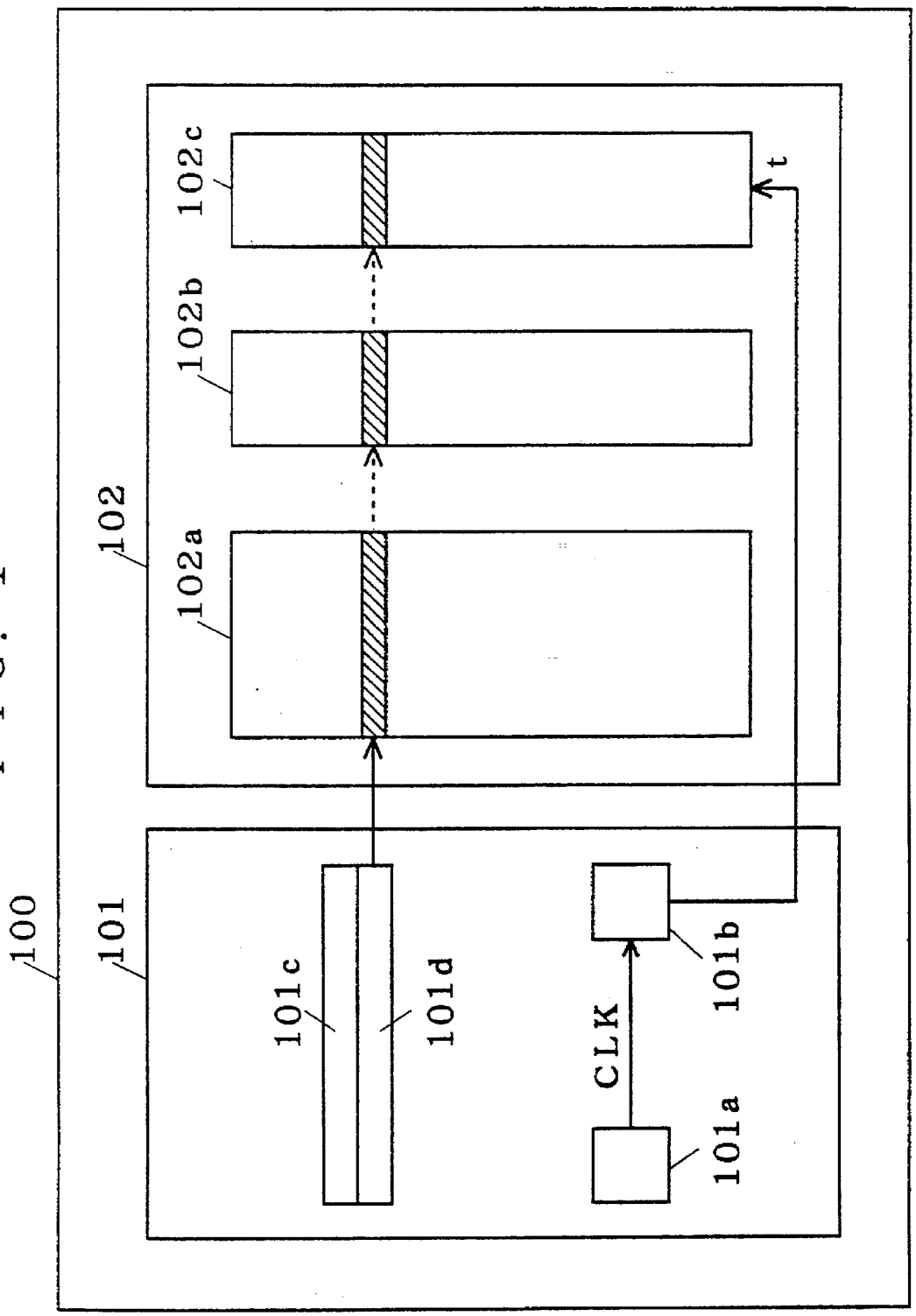
FIG. 1 notionally illustrates a first preferred embodiment according to the present invention.

A. Simulation Method for Accumulating Clock Cycle Count (a-1) First Preferred Embodiment FIG. 1 notionally illustrates a program (simulator) 100 for simulating the operation of a data processor in response to a clock pulse. The program 100 comprises a simulation engine (simulation core) 101 for performing simulation of a data processor to be simulated, and a memory space 102 including various arrays and programs arranged therein. Virtual implementation of the data processor to be simulated in software is generally done using hardware description languages, for example, Verilog-HDL. The program 100 discussed herein may be written in the C language which is a general programming language. A simulator using the C language is presented in, for example, "Technical Report of IEICE, VLD93-88, 1993, December, The Institute of Electronics, Information and Communication Engineers, pp.25-32".

The simulation engine 101 includes a clock generating element 101a for simulating a clock corresponding to a clock for the data processor to be simulated to generate a simulated clock CLK. The simulation of the data processor is executed in response to the simulated clock CLK.

The simulation engine 101 further includes a count element 101b for counting the simulated clock CLK to output a clock cycle count t of the simulated clock CLK. The clock generating element 101a and the count element 101b are software employing the above described languages.

A program 102a to be subjected to rate performance evaluation which is to be simulated by the simulation engine 101 is loaded to a portion of the memory space 102. The performance evaluation of the data processing rate is performed by the simulation engine 101 in response to the simulated clock CLK in accordance with the program 102a to be subjected to rate performance evaluation.

The simulation engine 101 further includes a program counter 101c for holding the address of a program instruction being executed by the simulation engine 101, and a program counter 101d for holding the address of the immediately preceding program instruction executed. The program counters 101c, 101d are software, and the simulation engine 101 is also software.

An execution count storage array 102b and a cumulative clock cycle count storage array 102c are further allocated to the memory space 102. The execution count storage array 102b and the cumulative clock cycle count storage array 102c hold the number of times an instruction corresponding to the address held by the program counter 101d is executed and the accumulating total number of clock cycles (referred to hereinafter as a "cumulative clock cycle count") required for the execution, respectively. These arrays 102b and 102c are also software.

Figure 2:
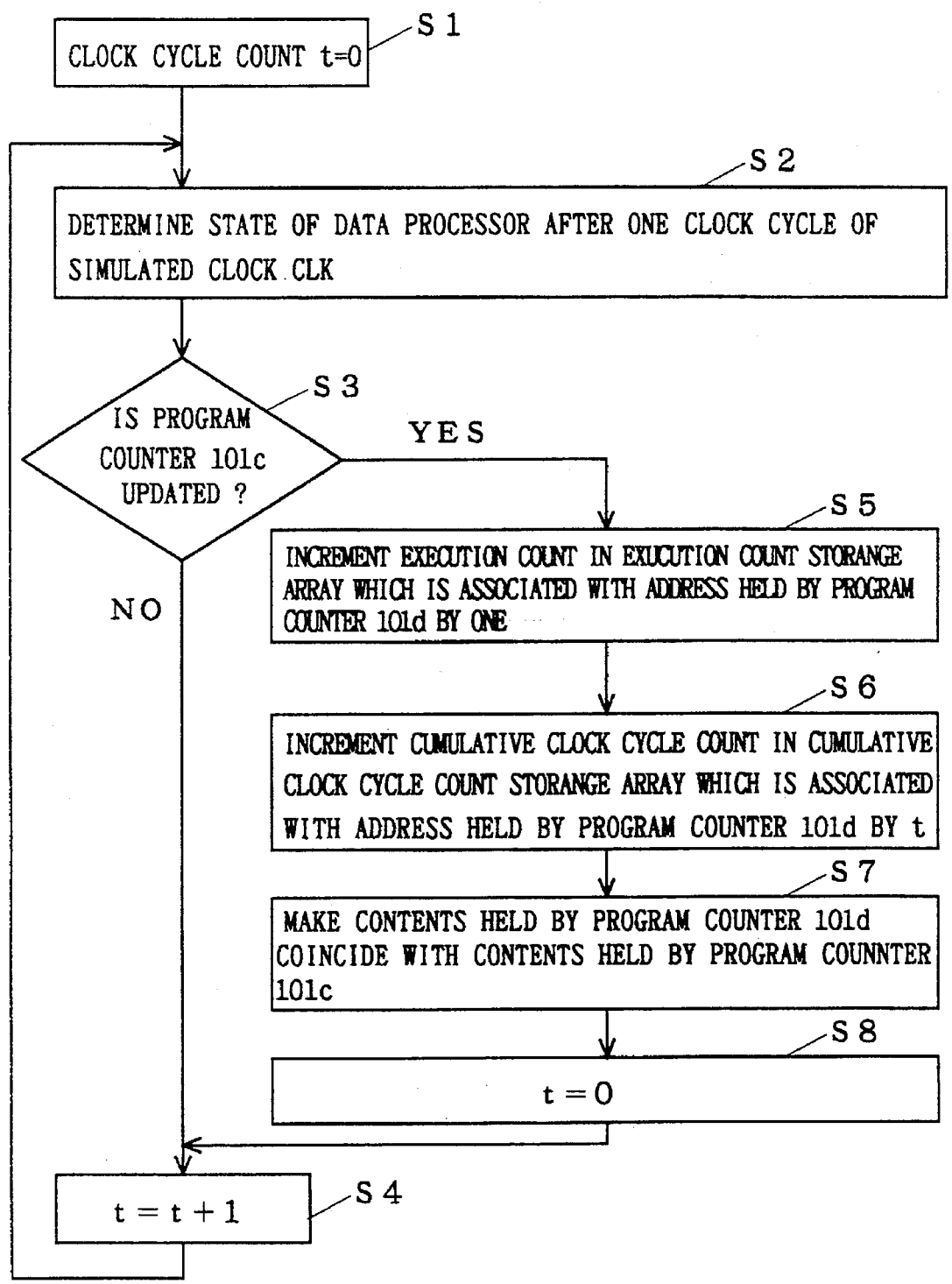
FIG. 2 is a flow chart of the first preferred embodiment according to the present invention.

FIG. 2 is a flow chart illustrating a method for performance evaluation of the data processing rate by the execution of the program 100 of FIG. 1. In the step S1, the simulation engine 101 resets the clock cycle count t for the count element 101b to zero. In the step S2 is determined the state of the data processor after one clock cycle of the simulated clock CLK. When the state of the data processor after one clock cycle of the simulated clock CLK causes a new instruction to be fetched, the program counter 101c is updated. It should be noted that, in general, an instruction is not necessarily terminated after one clock cycle of the simulated clock CLK but is sometimes terminated after a plurality of clock cycles of the simulated clock CLK. When the new instruction is not fetched, the program counter 101c is not updated.

No updating of the program counter 101c is equivalent to no fetch of the new instruction corresponding to the address held by the program counter 101c, that is, the continued execution of the instruction corresponding to the address held by the program counter 101c. In this case, since the execution of this instruction requires time corresponding to at least one clock cycle of the simulated clock, the method proceeds to the step S4 in which one is added to the clock cycle count and then returns to the step S2 for the next state.

On the other hand, when the program counter 101c is updated in the step S3, the method proceeds to the step S5 in which the value of the execution count in the execution count storage array 102b is incremented by one. It is an execution count associated with the address held by the program counter 101d that is incremented by one. Since the program counter 101c has already been updated in the step S3, the result is the termination of one execution of the immediately preceding instruction, and the execution count corresponding thereto is incremented by one.

In the step S6, the time (the clock cycle count) required for execution of the execution-terminated instruction is added to the cumulative clock cycle count in the cumulative clock cycle count storage array 102c. The cumulative clock cycle count added herein is associated with the instruction, and contains the time required for prior execution, if carried out, of the instruction. The cumulative clock cycle count associated with an instruction accordingly indicates the accumulating total times required to execute the instruction if the instruction is executed a plurality of times (for example, when a loop is repeated). That is, the execution time required for the execution repeated in a loop may be obtained for the instruction executed repeatedly in the loop.

In the step S7, the contents held by the program counter 101d are made to coincide with the contents held by the program counter 101c, and the program counter 101d holds the address of the instruction to be executed next. In the step S8, the number of clocks t for the count element 101b is reset to zero. Then the number of clocks t is incremented by one in the step S4.

In this manner, the first preferred embodiment is adapted such that execution count in simulation of the simulation engine 101 and the cumulative clock cycle count required for the execution are arranged for the same one of the various instructions executed by the program 102a to be simulated and are then stored in the execution count storage array 102b and the cumulative clock cycle count storage array 102c, respectively. Therefore, the number of times the same instruction is executed is determined, and the accumulating total time of the instruction execution is determined as the clock cycle count of the simulated clock.

The first preferred embodiment requires neither the functions for deriving the start and end times for each instruction nor the periodically interrupting sampling program and, therefore, has the rate performance evaluation accuracy which is not limited by the overhead associated with the functions and sampling program. In addition, the first preferred embodiment provides the execution time required to execute the instruction repeatedly in a loop, and may evaluate all instructions of the program 101 with only one execution of the program 101.

(a-2) Second Preferred Embodiment

Figure 3:
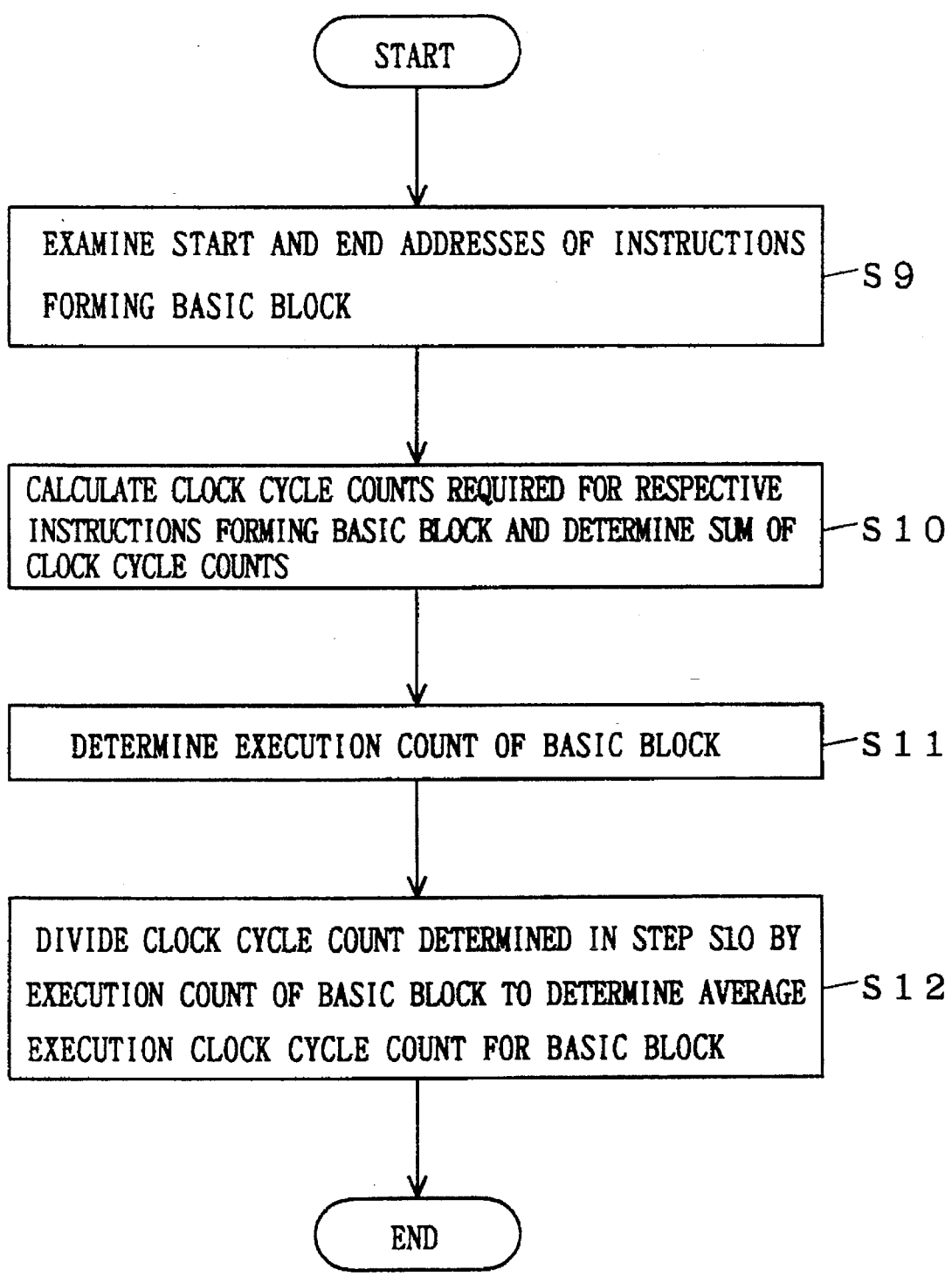
FIG. 3 is a flow chart of a second preferred embodiment according to the present invention.

FIG. 3 is a flow chart of a second preferred embodiment according to the present invention. The method of the second preferred embodiment may evaluate the rate performance of, in particular, a basic block portion. The basic block is a train of successive instructions ensured to be executed from the beginning of the basic block without jumps into and out of a mid-portion thereof.

In the step S9, the start and end addresses of the instructions forming the basic block of interest are examined. Because of the properties of the basic block, the execution counts of the instructions at the respective addresses in the basic block are definitely equal when the method of the first preferred embodiment is employed. Conversely, different execution counts of the instructions represent a wrong flow of the program or incorrect range determination of the basic block.

In the step S10, the cumulative clock cycle counts required to execute the respective instructions forming the basic block are calculated, and the sum of the cumulative clock cycle counts is determined. The cumulative clock cycle count is determined by the method of the first preferred embodiment.

In the step S11, the execution count of the basic block is determined. Because of the properties of the basic block, the execution count of the basic block is equal to the execution count of the instruction at any address in the basic block. Thus the execution count of the instruction at any address in the basic block may be determined as the execution count of the basic block.

In the step S12, the cumulative clock cycle count required for the basic block is divided by the execution count to determine an average execution clock cycle count for the basic block.

(a-3) Third Preferred Embodiment

Figure 4:
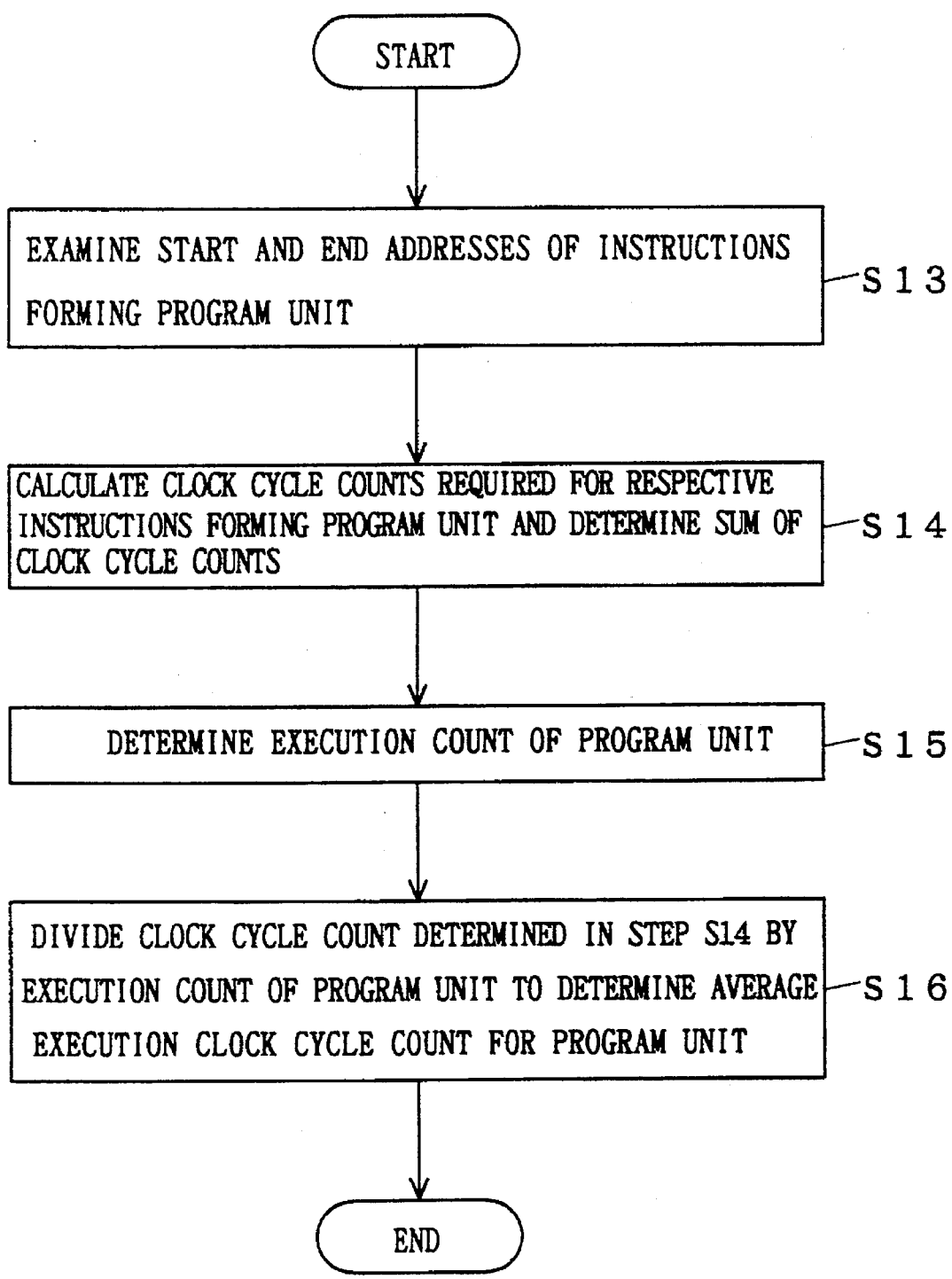
FIG. 4 is a flow chart of a third preferred embodiment according to the present invention.

FIG. 4 is a flow chart of a third preferred embodiment according to the present invention. The method of evaluating the data processing rate of the third preferred embodiment can evaluate the rate, in particular, for each program unit (subprogram) such as functions and procedures in a program.

In the step S13, the start and end addresses of the instructions forming a program unit are examined. Then, like the second preferred embodiment, the cumulative clock cycle counts required for the respective instructions forming a block corresponding to the program unit are calculated, and the sum of the cumulative clock cycle counts is determined in the step S14. The cumulative clock cycle count is determined by the method of the first preferred embodiment.

In the step S15, the execution count of the program unit is determined. The execution count of the program unit is determined by the number of jumps into the block indicative of the program unit from another block and out of the block indicative of the program unit. The above mentioned operation provides the cumulative clock cycle count required for the program unit and the execution count of the program unit. In the step S16, the cumulative clock cycle count required for the program unit is divided by the execution count of the program unit to determine an average execution clock cycle count for the program unit.

(a-4) Fourth Preferred Embodiment

Figure 5:
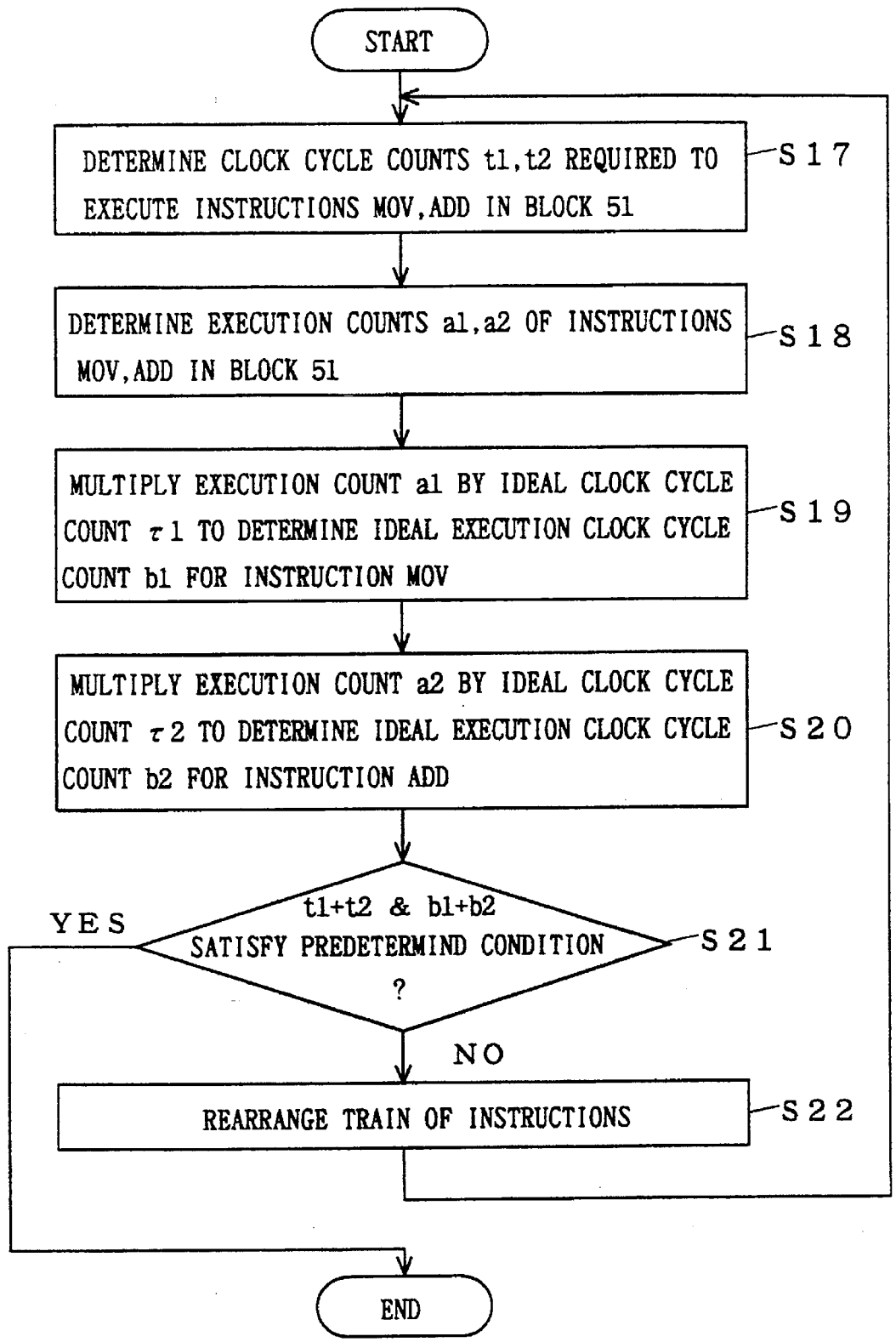
FIG. 5 is a flow chart of a fourth preferred embodiment according to the present invention.

FIG. 5 is a flow chart of a fourth preferred embodiment according to the present invention. The fourth preferred embodiment judges whether or not an excess number of execution clock cycles are required during the execution of a program by comparison between the clock cycle count required for execution of an instruction and an ideal execution clock cycle count required for ideal execution of the instruction to evaluate the data processing rate.

Figure 6:
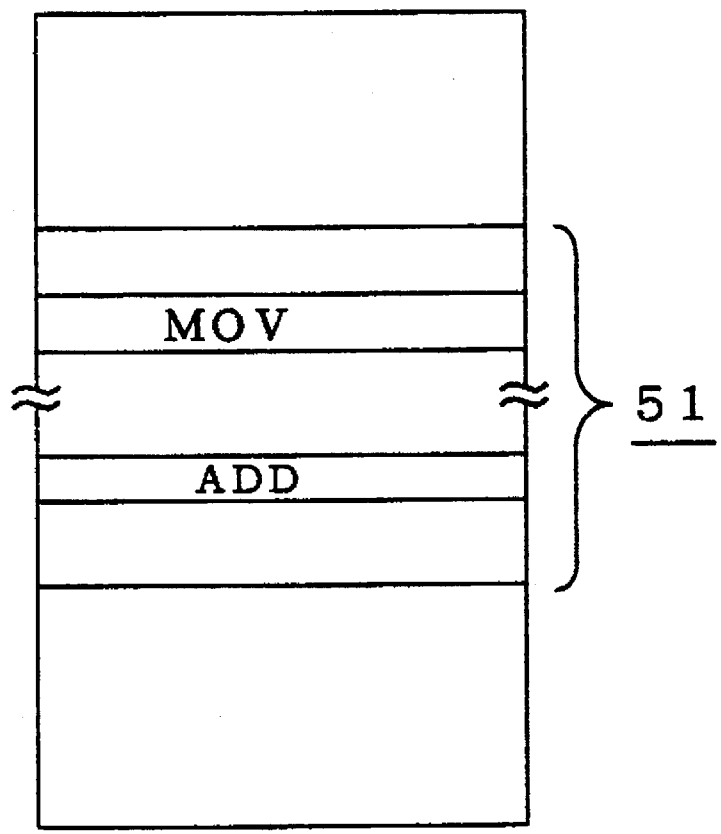
FIG. 6 notionally illustrates the fourth preferred embodiment according to the present invention.

FIG. 6 notionally illustrates a program 105 to be subjected to rate performance evaluation which includes a block 51. The block 51 has a plurality of instructions. Description will be given herein with respect to two instructions MOV and ADD.

The execution count of the instructions MOV, ADD and the cumulative clock cycle count required for the execution when the block 51 is executed are determined using the method of the first preferred embodiment.

The clock cycle count required for execution of the instructions in an ideal state is referred to hereinafter as an "ideal cumulative clock cycle count". Specifically, a pipeline state is ideal, and the ideal cumulative clock cycle count is a cumulative clock cycle count required to execute the instructions, with a memory data operation required for instruction execution being performed smoothly.

Thus multiplying the ideal cumulative clock cycle count by the execution count for each instruction provides a cumulative clock cycle count (referred to hereinafter as an "ideal execution cumulative clock cycle count") for each instruction, with the block 51 executed under ideal conditions. The data processing rate may be evaluated by comparing the ideal execution cumulative clock cycle count with the cumulative clock cycle count.

More specifically, the cumulative clock cycle counts $t_1$, $t_2$ required to execute the instructions MOV, ADD in the block 51 are determined in the step S17. This is implemented by using the method of the first preferred embodiment as above mentioned.

The execution counts $a_1$, $a_2$ of the instructions MOV, ADD in the block 51 are determined in the step S18. This is also implemented by using the method of the first preferred embodiment.

In the steps S19 and S20 are determined the ideal execution cumulative clock cycle counts. First, the ideal execution cumulative clock cycle count $b_1$ for the instruction MOV is calculated in the step S19.

$$b_1 = a_1 \times \tau_1 \tag{1}$$

where $\tau_1$ is the ideal cumulative clock cycle count for the instruction MOV.

The ideal execution cumulative clock cycle count $b_2$ for the instruction ADD is calculated in the step S20.

$$b_2 = a_2 \times \tau_2 \tag{2}$$

where $\tau_2$ is the ideal cumulative clock cycle count for the instruction ADD.

The sum of the cumulative clock cycle count $h$ for the instruction MOV and the cumulative clock cycle count $t_2$ for the instruction ADD is compared with the sum of the ideal execution cumulative clock cycle count $b_1$ for the instruction MOV and the ideal execution cumulative clock cycle count $b_2$ calculated in this manner, and it is judged whether nor not the sums satisfy a predetermined condition in the step S21. For example, if $$t_1=25, t_2=68, \tau_1=2, \tau_2=3, a_1=10, a_2=20 \tag{3}$$

then $$b_1+b_2=10\times 2+20\times 3=80,$$

$$t_1+t_2=25+68=93 \tag{4}$$

which indicates that the arrangement of a train of instructions in the block 51 is not ideal for the execution of the instructions MOV, ADD. The predetermined condition established in the step S21 judges whether or not the difference 13 (=93−80) between the cumulative clock cycle counts is allowable.

When the predetermined condition is not satisfied (that is, when the difference between the cumulative clock cycle count and the ideal execution cumulative clock cycle count is not allowable), the instructions in the instruction train are rearranged for improvement in the pipeline state so as to smoothly perform the memory data operation in the step S22. When the predetermined condition is satisfied, no rearrangement of the instructions in the instruction train is required.

In this manner, the fourth preferred embodiment provides the step of comparing the clock cycle count required for instruction execution in the ideal state and the clock cycle count required for instruction execution in the practical simulation. Thus the rate performance of the program may be evaluated by judging whether or not an excess number of execution clock cycles are required during the execution of the program because of the structure of the data processor. The rearrangement of a train of instructions in the block may provides a near-ideal execution clock cycle count for optimization.

B. Combination of Two Types of Simulation Methods (b-1) Fifth Preferred Embodiment The previous section "A. Simulation Method for Accumulating Clock Cycle Count" describes the simulator (program 100) which allows correct evaluation as to which portion of the program takes much time without fragmentation of the program. The simulator for simulating the operation of the data processor in response to a clock pulse in this manner is referred to hereinafter as a "first type simulator".

Widely used conventional simulators are adapted to virtually implement an internal state after instruction execution for each instruction of the data processor when a program operated on the data processor is simulated. This type of simulator (referred to hereinafter as a "second type simulator") is intended to simulate only the internal state after instruction execution but not to simulate the internal operation of the data processor in the course of instruction execution. Japanese Patent Application Laid-Open No. 4-112338 (1992) and Japanese Patent Application Laid-Open No. 5-158740 (1993) disclose the second type simulator.

For example, Japanese Patent Application Laid-Open No. 4-112338 discloses the technique of employing a simulator for virtually implementing the internal state for each instruction to execute the program to be evaluated. In this disclosure, virtual machines collect information about the use of their constituents for execution to perform the performance evaluation using probability information on the basis of the collected information. However, the values provided on the basis of the technique do not correctly evaluate the cumulative clock cycle count required for execution.

Japanese Patent Application Laid-Open No. 3-282642 (1991) discloses the technique of replacing the instructions within a specified address range with interruption instructions to count the number of executed instructions within the specified range. The instructions are replaced with the interruption instructions, and the cumulative clock cycle count required for execution is predicted from the number of executed instructions within the specified range.

In this manner, the second type simulator computes the cumulative clock cycle count required for execution less correctly but at a higher processing rate than the first type simulator. The advantage of one of the first and second types of simulators is the disadvantage of the other. Combination of the first and second types of simulators provides advantageous simulation methods employing the advantages of the respective simulators efficiently.

The reasons therefor will be described below. It is naturally essential to perform the performance evaluation of the whole program. However, a program is developed through the following procedure: (1) performing the performance evaluation of the whole program and then finding a portion to be tuned from the result thereof; (2) renovating the portion so that the portion is processed at a desired processing rate; and (3) performing the performance evaluation of the whole program again.

It is thus critical to evaluate the performance of a specific portion of the program to be evaluated. With the increasing scale of the program to be developed, program execution takes a greater amount of time. In the light of these facts, it is desirable to evaluate the performance of the specific portion using the first type simulator which correctly determines the cumulative clock cycle count required for execution at a low processing rate and to evaluate the performance of portions other than the specific portion using the second type simulator which measures the cumulative clock cycle count required for execution, not correctly, but at a high processing rate.

The above described Japanese Patent Application Laid-Open No. 3-282642, for example, predicts the cumulative clock cycle count required for execution for the instructions to be executed within the specified range.

Japanese Patent Application Laid-Open No. 6-19736 (1994) discloses a technique on an emulator. A control microprocessor is separately provided for saving a trace memory. A preset area is executed for each instruction, and other areas are continuously executed to obtain information only on the preset predetermined area. This reduces a memory capacity since the contents of a register of a target microprocessor are stored in the trace memory for each instruction only in the preset area.

These techniques address a portion of the program in one way or another to evaluate the program portion but are based on a premise that instructions are replaced with interruption instructions and the microprocessor has an address trap function.

The technique disclosed in Japanese Patent Application Laid-Open No. 63-292337 (1988) is such that a general-purpose computer and a logic simulator are connected to each other with channels and data including virtual memory data are transferred between an instruction interpreter operated on the general-purpose icomputer and the logic simulator. In this technique, the program execution proceeds while being transferred between the instruction interpreter and the logic simulator.

However, to transfer the program execution between the instruction interpreter and the logic simulator, it is necessary to use an instruction for execution of the transfer which is known as a transfer instruction. Further, enormous volumes of data such as virtual memory data must be transferred, requiring a great amount of time. This is an inevitable problem in the program execution transferred between the general-purpose computer and logic simulator which virtually implement the data processor in different ways.

Preferred embodiments to be described below neither require the replacement of the instructions with the interruption instructions nor are based on the premise that the microprocessor has the address trap function but are enabled to perform the performance evaluation of the whole program without a great amount of time required for data transfer and to correctly evaluate the cumulative clock cycle count required for execution of a desired portion of the program.

Figure 7:
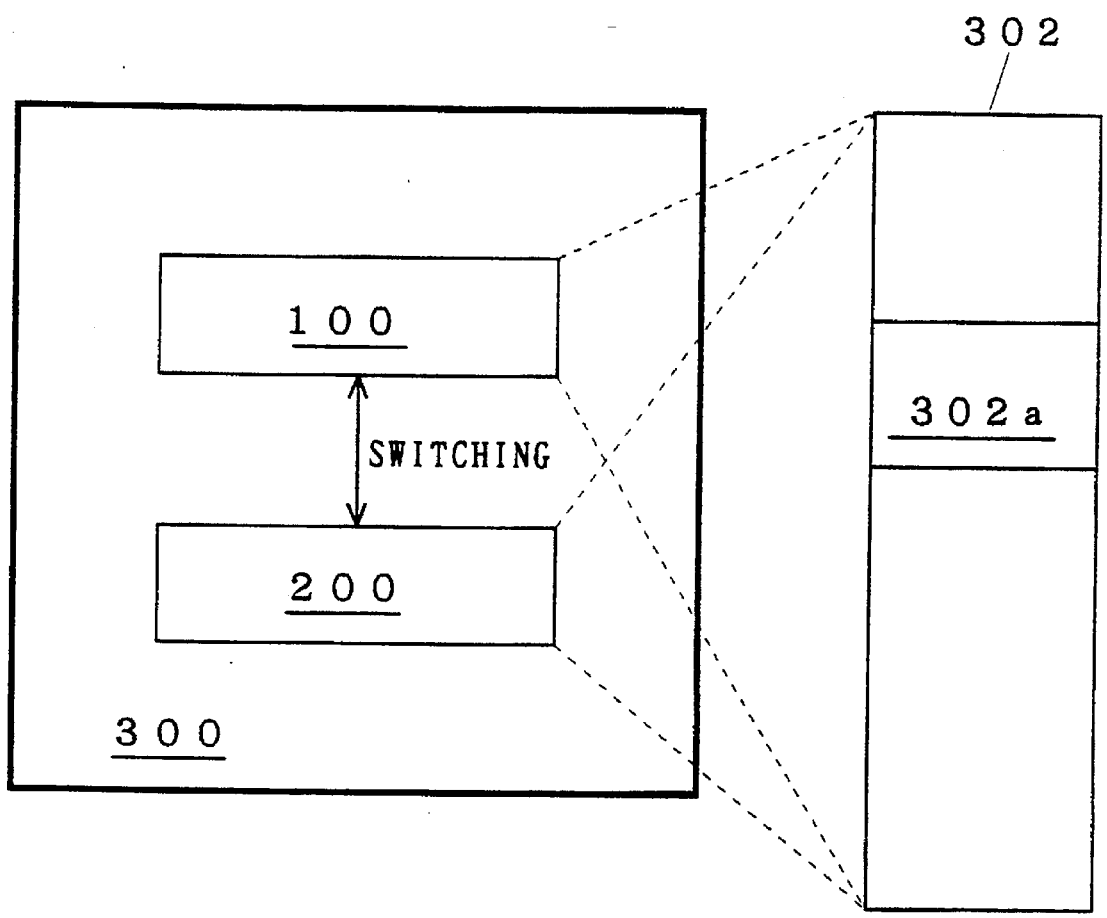
FIG. 7 notionally illustrates basic ideas of a fifth preferred embodiment according to the present invention.

A fifth preferred embodiment according to the present invention describes basic ideas. FIG. 7 notionally illustrates a simulator 300. The simulator 300 comprises the first type simulator 100 discussed in the first preferred embodiment and a second type simulator 200. As stated above, the simulators 100 and 200 may be constructed in software by using the languages. Accordingly, the simulator 300 may be constructed in software. The simulators 100 and 200 virtually implement the same data processor.

The simulators 100 and 200 share a memory space 302 which may be a software array. A program 302a to be subjected to rate performance evaluation is loaded onto the memory space 302.

The simulator 300 simulates the program 302a in such a manner that the simulator 100 performs simulation while correctly evaluating the clock cycle count required for execution in an area to be subjected to performance evaluation and the simulator 200 performs simulation at high speeds in an area which is not to be subjected to performance evaluation.

Such switching between the simulators 100 and 200 which virtually implement the same data processor does not cause discontinuous execution of the simulation of the program 302a. The memory space 302 loaded with the program 302a is shared between the simulators 100 and 200, preventing data transfer from taking a great amount of time.

In this manner, the simulator 300 comprises the first type simulator 100 and the second type simulator 200 in combination and performs simulation while switching between the simulator 100 for the area to be subjected to performance evaluation and the simulator 200 for other areas, thereby evaluating the program 302a at high speeds yet correctly.

(b-2) Sixth Preferred Embodiment

Figure 8:
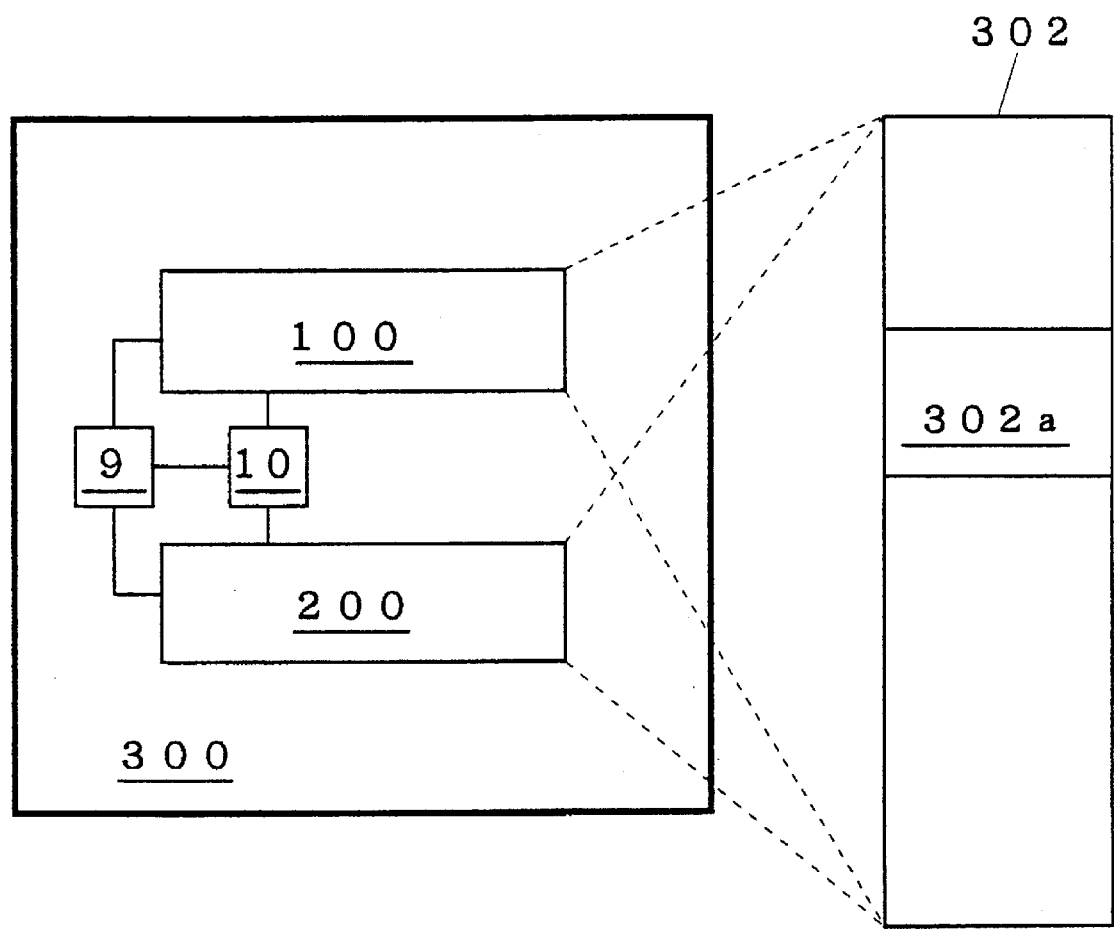
FIG. 8 notionally illustrates a sixth preferred embodiment according to the present invention.

A sixth preferred embodiment according to the present invention details the switching between the simulators 100 and 200. FIG. 8 notionally illustrates the sixth preferred embodiment according to the present invention. The simulator 300 comprises a program counter 9 and a switching program 10.

The program counter 9 stores the address of an instruction to be simulated next to the instruction being simulated and is implemented as an array in software of the simulator 300.

The switching program 10 specifies one of the simulators 100 and 200, and the specified simulator performs the simulation of the program 302a.

Since the program 302a is loaded onto the memory space 302 shared between the simulators 100 and 200, the program counter 9 may readily store the address of the instruction common to the simulators 100 and 200. The switching program 10 reads the address of the instruction stored in the program counter 9 and then determines which one of the simulators 100 and 200 is to be selected to specify the selected simulator.

The simulator is not switched in the course of the execution of an instruction for the reasons to be described below. The pauses of simulation executed by the simulator 100 divide the program into a greater number of smaller portions than the pauses of simulation executed by the simulator 200. Each simulation pause common to the simulators 100 and 200 is located between two instructions. The two instructions are different and to be executed continuously. This results from the fact that the simulator 100 controls the state in the course of the instruction execution while the simulator 200 does not control the state in the course of the instruction execution but controls only the state after the instruction execution.

Figure 9:
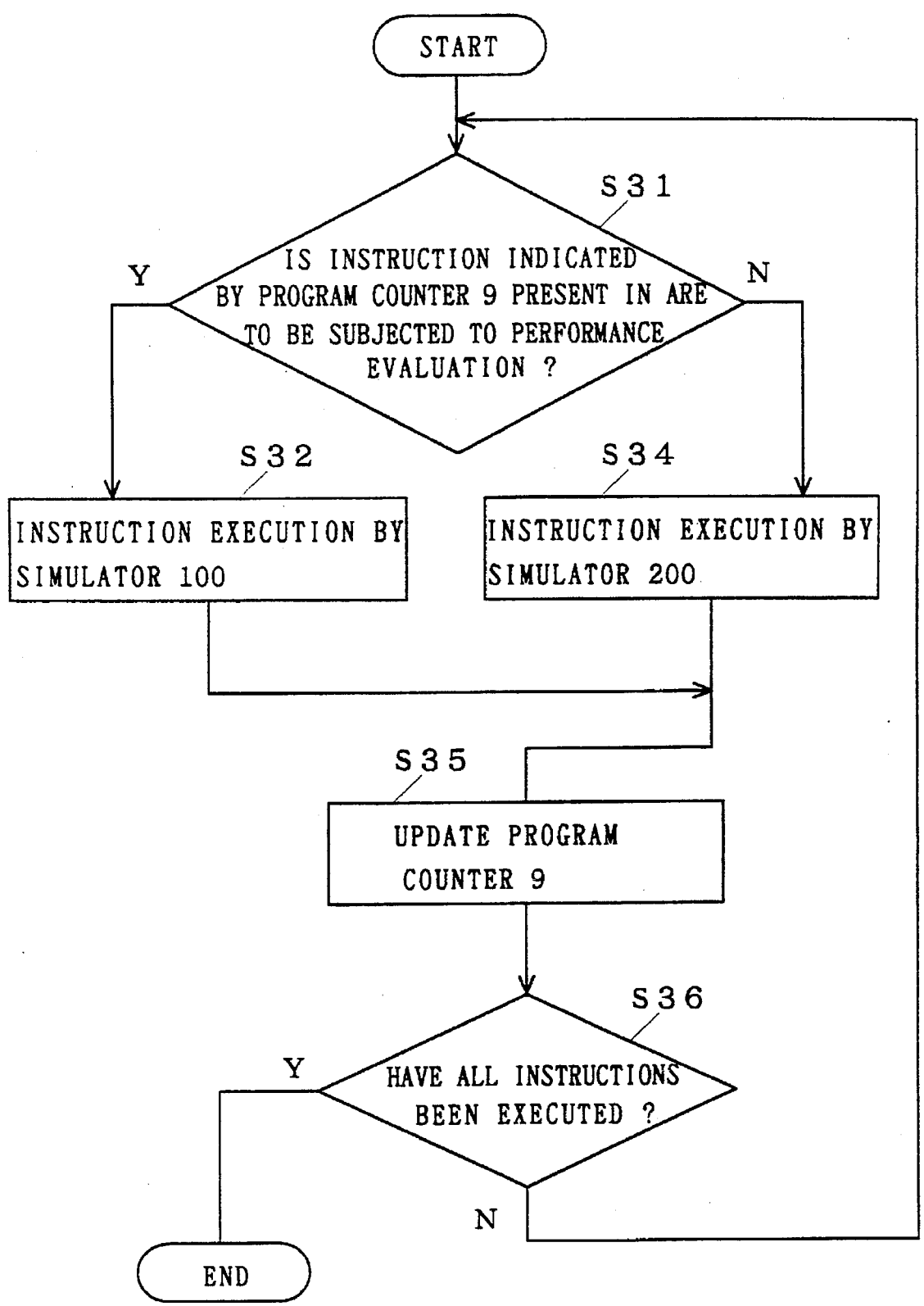
FIG. 9 is a flow chart of the sixth preferred embodiment according to the present invention.

FIG. 9 is a flow chart illustrating the procedure of the switching between the simulators 100 and 200. Upon starting the simulation, it is judged whether or not an instruction indicated by the program counter 9 is located in the area to be subjected to performance evaluation in the step S31.

If the instruction which is located in the area to be subjected to performance evaluation is stored in the program counter 9, the simulator 100 performs simulation in response to the simulated clock (step S32). In the simulator 100, the state of the data processor is virtually implemented for each simulated clock cycle. Upon completion of the instruction execution (sometimes requiring a plurality of simulated clock cycles to be updated) in the simulator 100, the program counter 9 is updated in the step S35.

On the other hand, if the instruction stored in the program counter 9 is absent in the area to be subjected to performance evaluation, the simulator 200 performs simulation for each instruction (step S34). Upon completion of the simulation, the program counter 9 is updated in the step S35.

After the program counter 9 is updated, it is judged whether or not all of the instructions of the program 302a have been executed (step S36). If the result is "YES", the simulation is terminated. If the result is "NO", the procedure returns to the step S31 to examine the contents of the program counter 9 again.

Figure 10:
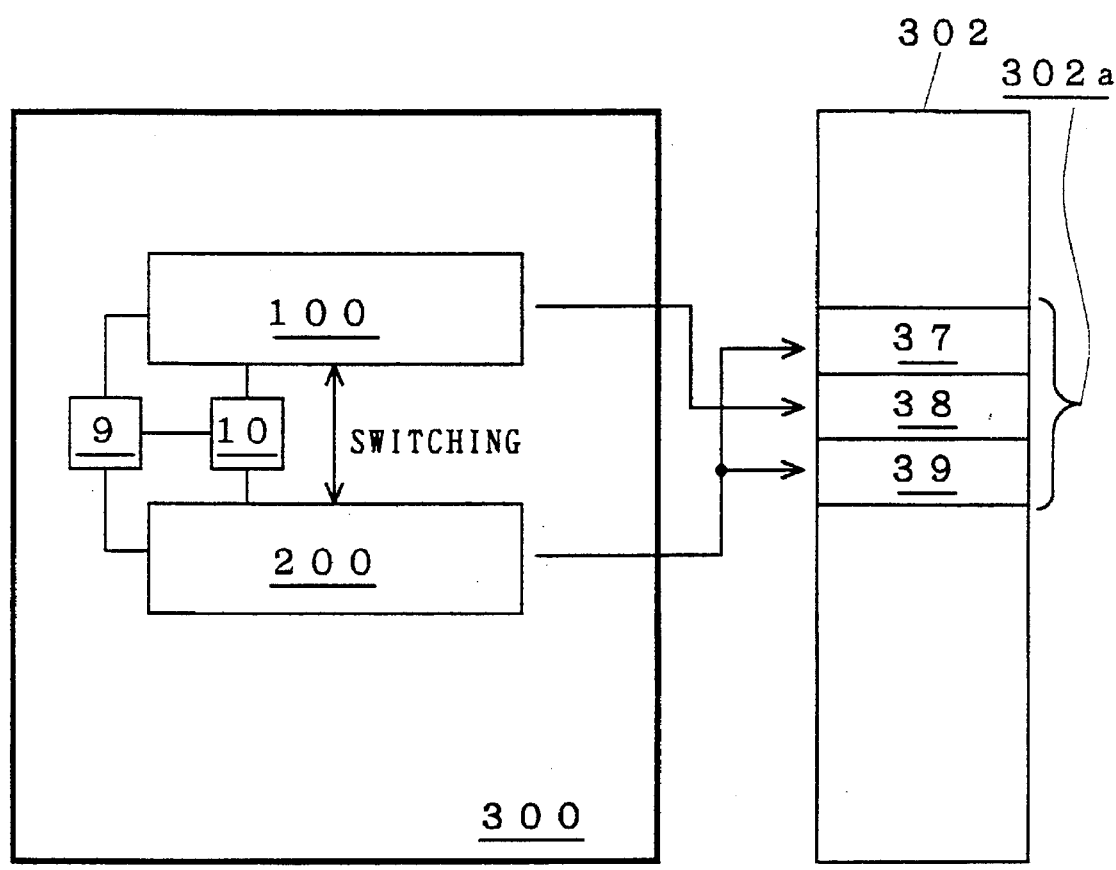
FIG. 10 notionally illustrates the sixth preferred embodiment according to the present invention.

Referring to FIG. 10, an example in which a specific function is to be subjected to performance evaluation is described. The program 302a to be subjected to rate performance evaluation consists of three areas 37, 38, 39. The area 38 is a specific function to be subjected to performance evaluation.

In the initial state of simulation of the program 302a, it is not necessary to correctly determine the cumulative clock cycle count required for execution. This is because the instruction stored in the program counter 9 is located in the area 37. Thus the switching program 10 specifies the simulator 200 for implementation of the simulation. This implementation is equivalent to the step S34 of FIG. 9.

As the simulation proceeds until the instruction stored in the program counter 9 is located in the area 38, the simulator 100 is specified which implements the simulation. This implementation is equivalent to the step S32 of FIG. 9.

As the simulation further proceeds until the instruction stored in the program counter 9 is located in the area 39, the simulator 200 is specified which implements the simulation. This implementation is equivalent to the step S34 of FIG. 9.

In this manner, the cumulative clock cycle count required for execution is correctly determined only for the specified function which is located in the area 38. For other instructions, the correctness of the cumulative clock cycle count is sacrificed for high-speed simulation.

(b-3) Seventh Preferred Embodiment

Figure 11:
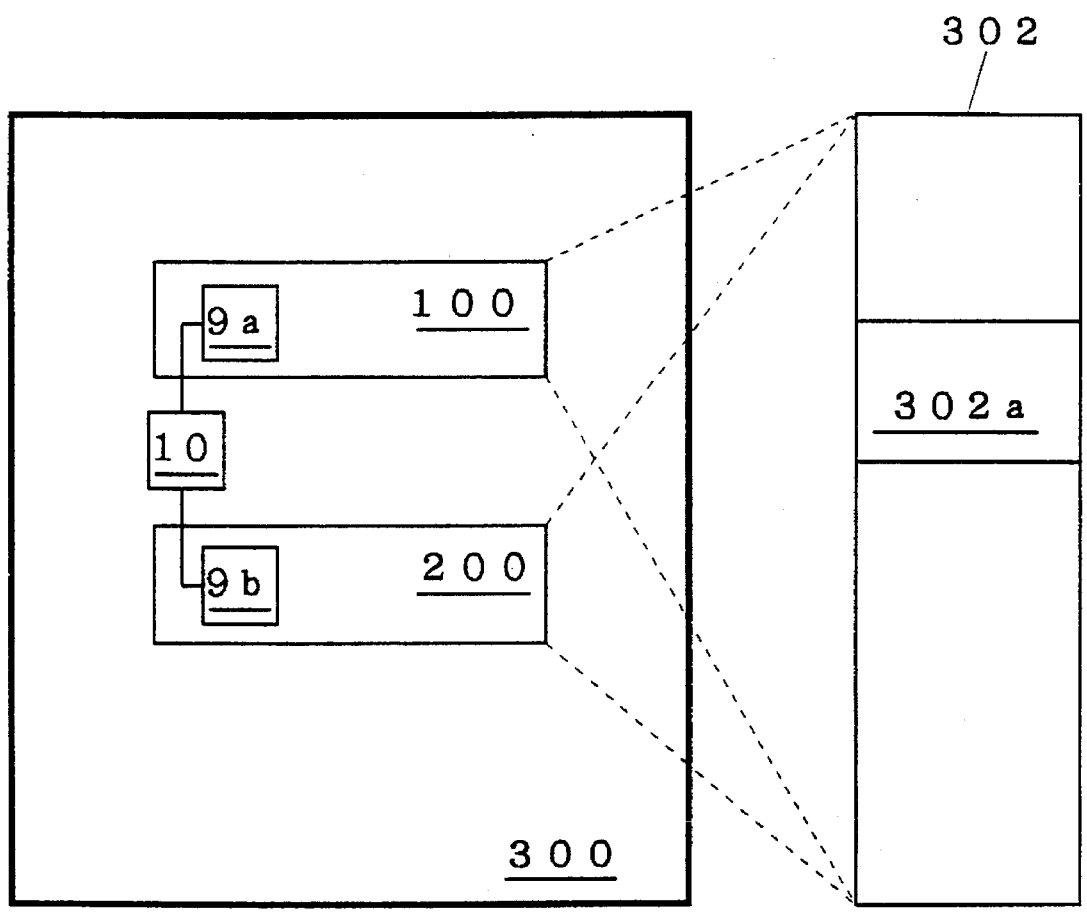
FIG. 11 notionally illustrates a seventh preferred embodiment according to the present invention.

FIG. 11 notionally illustrates a seventh preferred embodiment according to the present invention. Although the sixth preferred embodiment includes the program counter 9 outside the simulators 100 and 200, the simulators 100 and 200 may include the program counter as arrays 9a and 9b having the same contents stored therein as shown in FIG. 7, respectively.

In this arrangement, the contents (instruction addresses) stored in each of the arrays 9a, 9b formed in the simulators 100, 200 are updated when each of the simulators 100, 200 are not simulating, respectively. Or one of the simulators which is specified for simulation by the switching program 10 refers to the contents of the array in the other simulator to update the contents of the array in itself.

(b-4) Eighth Preferred Embodiment

Figure 12:
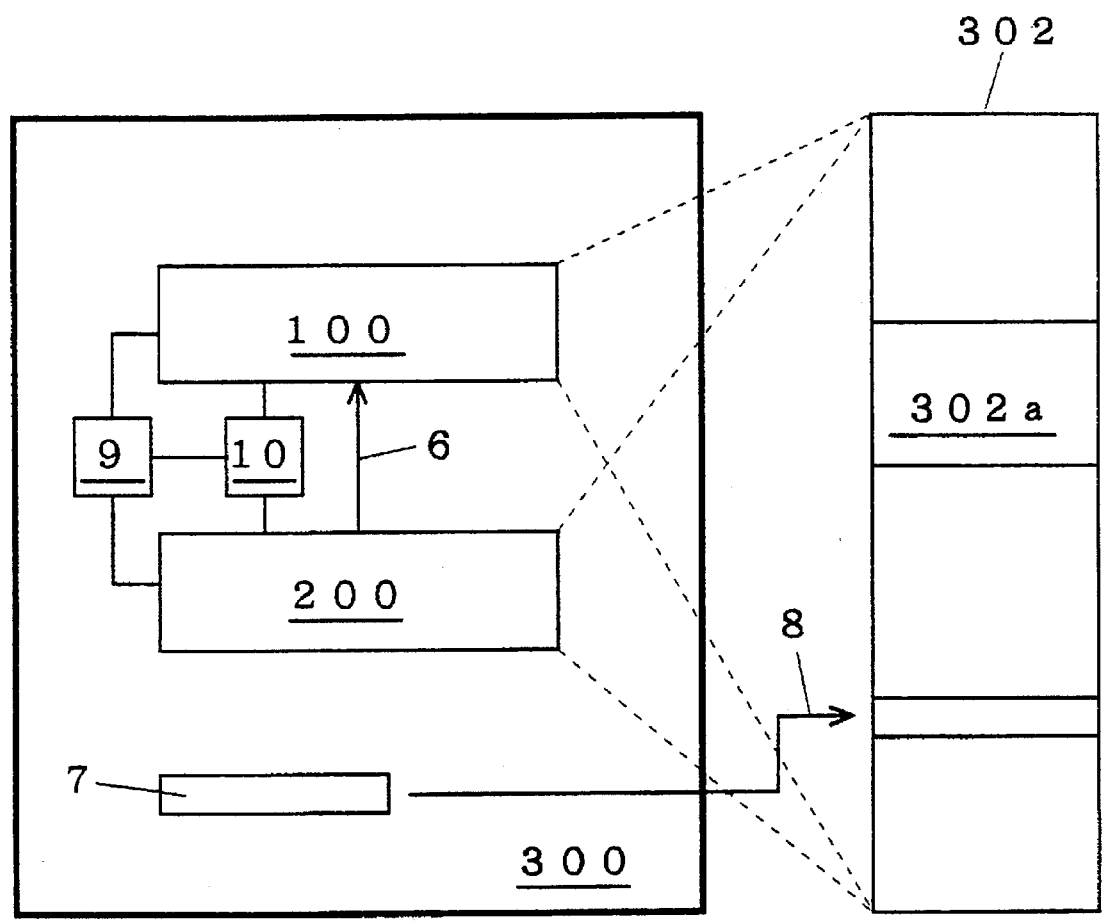
FIG. 12 notionally illustrates an eighth preferred embodiment according to the present invention.

FIG. 12 notionally illustrates an eighth preferred embodiment according to the present invention. As stated in the sixth preferred embodiment, the switching between the simulators 100 and 200 is done at the time when an instruction is terminated. This results from the fact that the simulator 100 controls the state in the course of the instruction execution while the simulator 200 does not control the state in the course of the instruction execution but controls only the state after the instruction execution.

Thus, registers and the like (directly associated with the program 302a and referred to hereinafter as "visible registers") formed as parts of the virtually implemented data processor in the simulator 200 are all constructed in the simulator 100. This is because the simulators 100, 200 virtually implement the same data processor and share the memory space 302.

Conversely, some registers and the like (which are not directly associated with the program 302a and which are referred to hereinafter as "invisible registers") formed as parts of the virtually implemented data processor in the simulator 100 are not constructed in the simulator 200.

Since transmission of only the contents of the visible registers from the simulator 100 to the simulator 200 is required, data are not insufficient for implementation of simulation in the simulator 200 when the simulation executor is switched from the simulator 100 to the simulator 200. On the other hand, when the simulation executor is switched from the simulator 200 to the simulator 100, values to be stored in the invisible registers required for simulation execution in the simulator 100 might probably not be specified. The result is that the values provided to the invisible registers by the simulation execution of the simulator 100 prior to the switching of the simulation executor from the simulator 200 to the simulator 100 are used in restarting the simulation by the simulator 100 by the switching of the simulation executor, which might cause incorrect simulation.

To prevent such situations, the simulator 300 comprises a CPU reset program 7. The CPU reset program 7 is a program for initializing the invisible registers and the execution start address and generally used to simulate the reset of hardware when the simulator simulates the operation of the hardware.

In this preferred embodiment, the CPU reset program 7 is executed when the simulator 100 restarts. Specifically, the CPU reset program 7 is loaded into a free area in the memory space 302 (the arrow 8) and executed in the simulator 100 to reset the contents of the invisible registers in the simulator 100. This prevents the value previously provided to the invisible registers by the simulation execution of the simulator 100 from being used in restarting the simulation by the simulator 100 by the switching of the simulation executor.

In this case, only the contents of the invisible registers included in a CPU of the data processor virtually implemented in the simulator are reset, but the contents of the visible registers in the simulator 200 remain set by an instruction just terminated in the simulator 200 and are copied to the visible registers in the simulator 100 (the arrow 6). The simulation for the data processor in the simulator 100 restarts in response to the instruction stored in the program counter 9.

The copying operation of the contents of the visible registers indicated by the arrow 6 may be carried out by the CPU reset program 7. In this case, the CPU reset program 7 may also copy the contents of the visible registers from the simulator 100 to the simulator 200. Then the CPU reset program 7 is also executed in switching from the simulator 100 to the simulator 200.

(b-5) Ninth Preferred Embodiment

In the data processor to be simulated, a breakpoint is sometimes hit, which causes the operation to be interrupted. Such an operation interrupt occurs to wait for a command entry, for example.

This interrupt is virtually implemented in simulation. The ninth preferred embodiment describes the entry of a command for specifying whether or not to execute performance evaluation after the operation interrupt.

Figure 13:
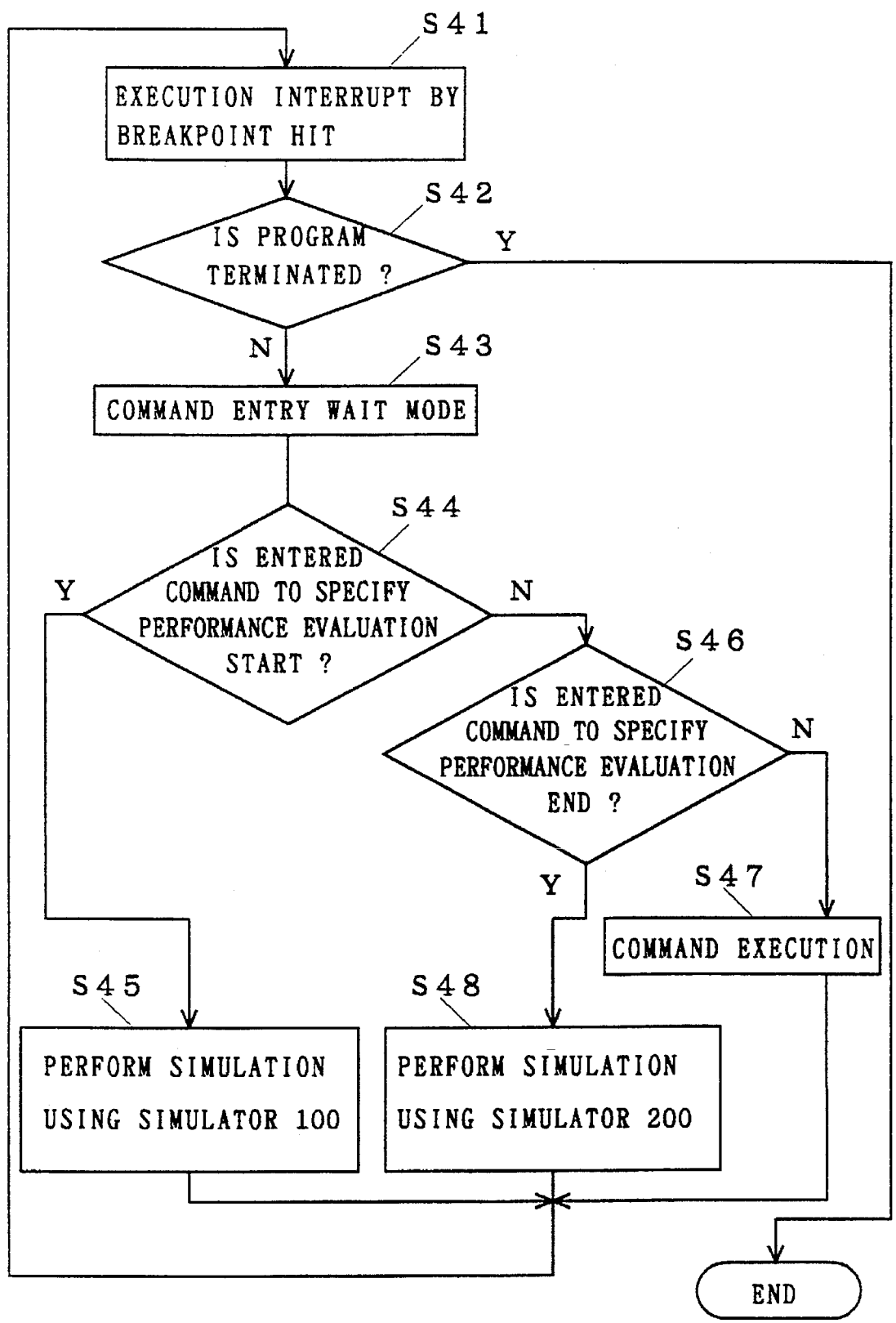
FIG. 13 is a flow chart of a ninth preferred embodiment according to the present invention.

FIG. 13 is a flow chart for illustrating the ninth preferred embodiment according to the present invention. The step S41 depicts an operation interrupt by a breakpoint hit. This occurs by the breakpoint hit and the like as a result of execution of the program 302a, whether in the simulator 100 or in the simulator 200. However, since the termination of the program 302a itself is equivalent to the execution interrupt, the flow is terminated in the step S42 if the interrupt results from the program termination in the step S41.

When it is judged that the program is not terminated in the step S42, the flow proceeds to the step S43 wherein a transition takes place to a command entry wait mode (the step S43).

In the step S44, it is judged whether or not an entered command is to specify the start of performance evaluation of the program. If the result is "YES", it is necessary to correctly determine the cumulative clock cycle count required for execution of an instruction to be simulated. Then the flow proceeds to the step S45 in which simulation is performed using the simulator 100.

On the other hand, if the judgement result is "NO" in the step S44, a further judgement is made as to whether or not the command is to specify the end of performance evaluation of the program (the step S46).

If the judgement result is "YES" in the step S46, there is no need to correctly determine the cumulative clock cycle count, and simulation is performed using the simulator 200 for high-speed simulation (the step S48).

If the judgement result is "NO" in both of the steps S44 and S46, the command is executed by means of the simulator which has been used when interrupted.

Interrupts (including termination) take place again after execution of the steps S45, S47, S48, and the flow returns to the step S41.

In this manner is executed high-speed simulation for correctly determining the cumulative clock cycle count required for instruction execution between the command specifying the start of performance evaluation and the command specifying the end of performance evaluation.

(b-10) Tenth Preferred Embodiment

Figure 14:
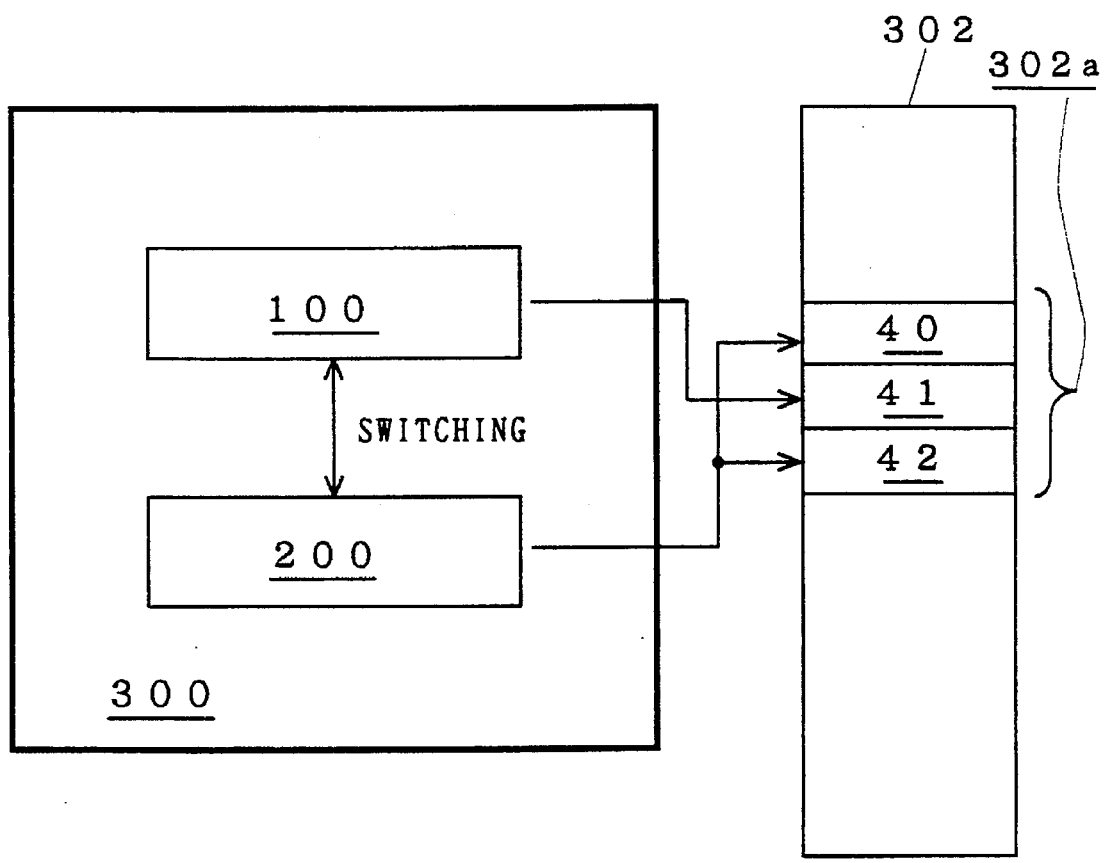
FIG. 14 notionally illustrates a tenth preferred embodiment according to the present invention.

FIG. 14 notionally illustrates a tenth preferred embodiment according to the present invention. The tenth preferred embodiment discusses simulation when the program 302a to be subjected to rate performance evaluation includes a specific instruction. The specific instruction is such an instruction that the cumulative clock cycle count required for execution thereof need not be determined correctly.

For example, the program to be evaluated sometimes includes instructions for calling an operating system and an I/O library. By defining these instructions as the specific instructions, the cumulative clock cycle count required only between the user and the program except the execution time thereof may be calculated for evaluation of the program performance.

The program 302a to be subjected to rate performance evaluation consists of a specific instruction 41 and other areas 40, 42. The simulator 200 is used only for the specific instruction 41 while the simulator 100 is used for other instructions.

Figure 15:
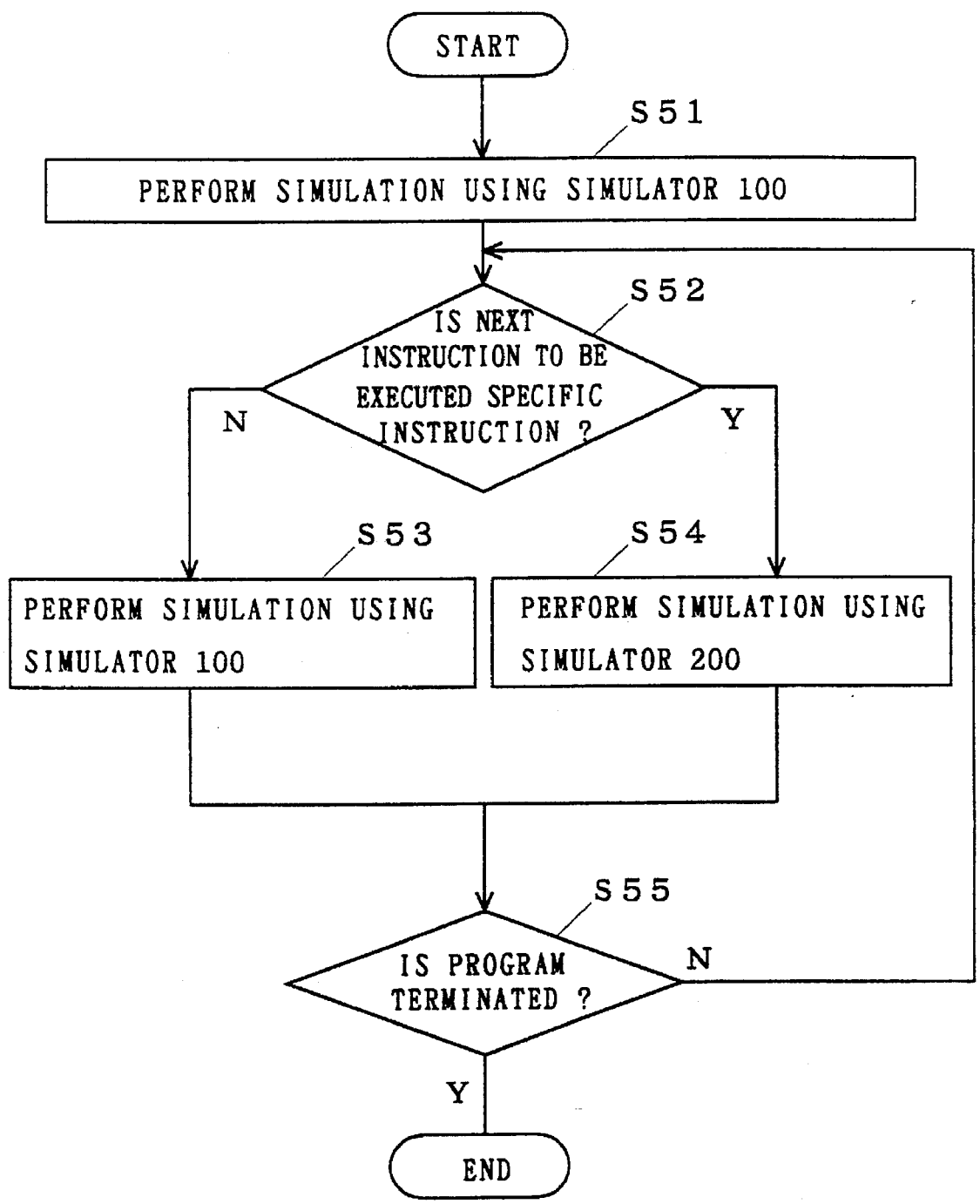
FIG. 15 is a flow chart of the tenth preferred embodiment according to the present invention.

FIG. 15 is a flow chart illustrating the execution of such simulation. After simulation start, simulation using the simulator 100 is executed in the step S51. In the step S52, it is judged whether or not the next instruction to be executed is the specific instruction. If the judgement result is "YES", it is not necessary to correctly determine the cumulative clock cycle count, and high-speed simulation is executed using the simulator 200 (the step S54). If the judgement result is "NO", the simulator 100 continues executing the simulation while correctly determining the cumulative clock cycle count (the step S53).

After the execution of the step S53 or S54, it is judged in the step 55 whether or not the program is terminated. If it is terminated, the simulation is terminated. If it is not, the flow returns to the step S52.

Repeating the procedure allows correct and high-speed determination of only the cumulative clock cycle count required for program execution except the execution of the specific instruction.

(b-7) Eleventh Preferred Embodiment

Figure 16:
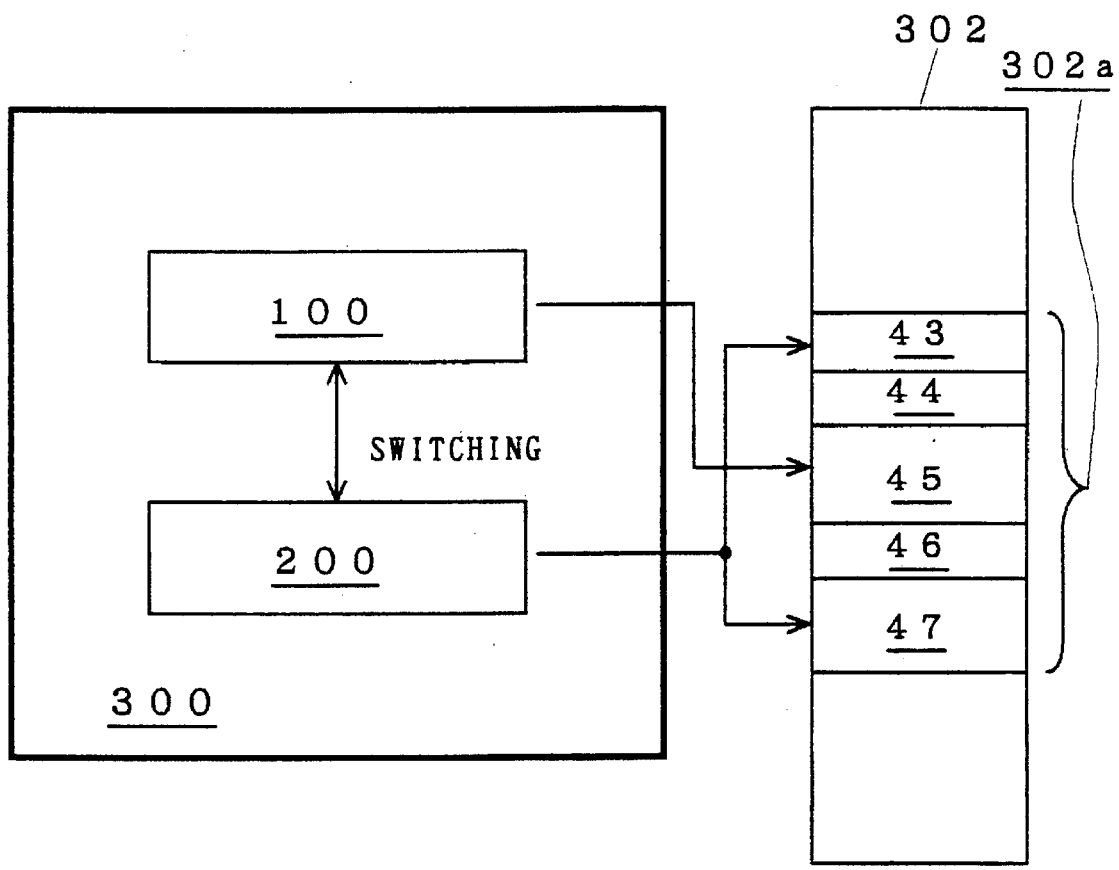
FIG. 16 notionally illustrates an eleventh preferred embodiment according to the present invention.
Figure 17:
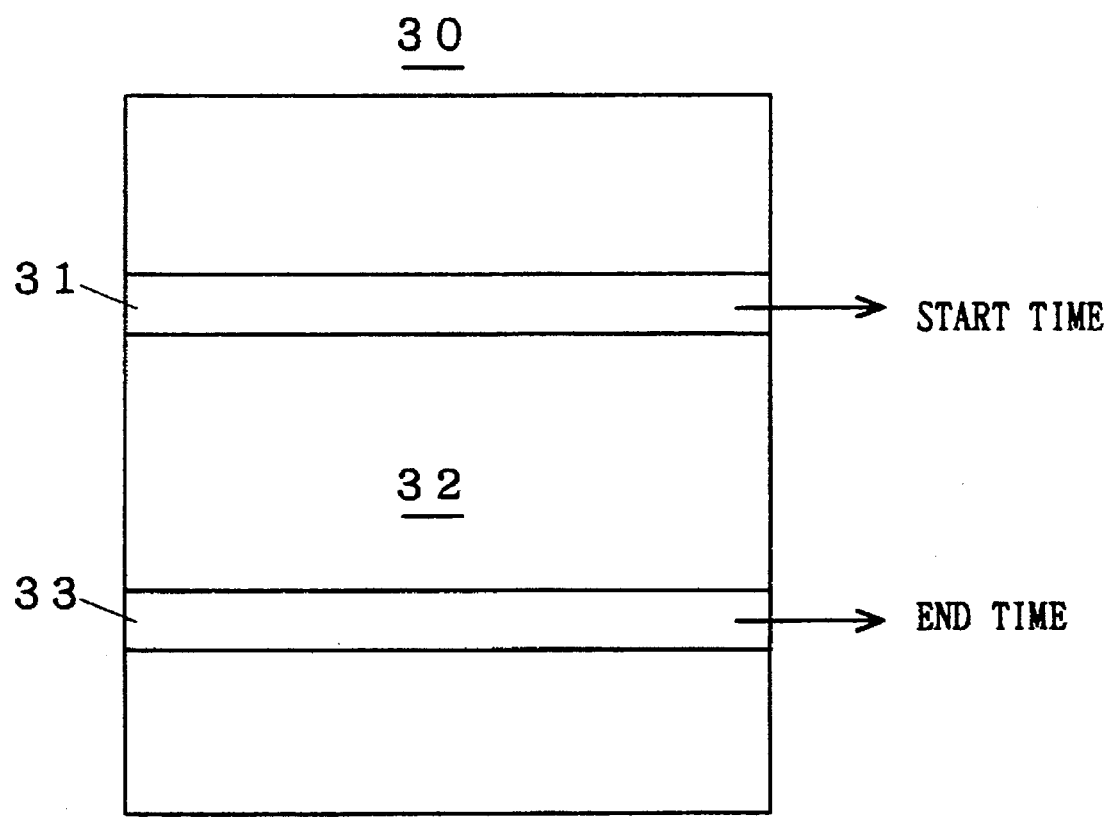
FIGS. 17 to 19 notionally illustrate the background art.
Figure 18:
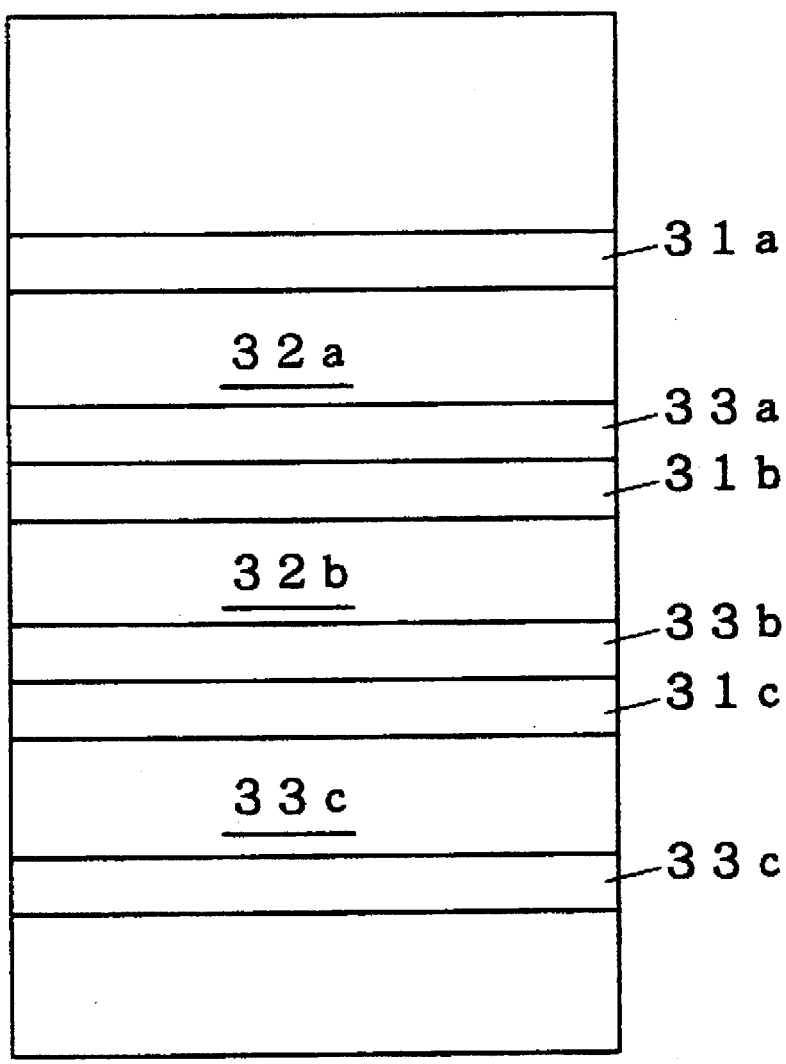
Figure 19:
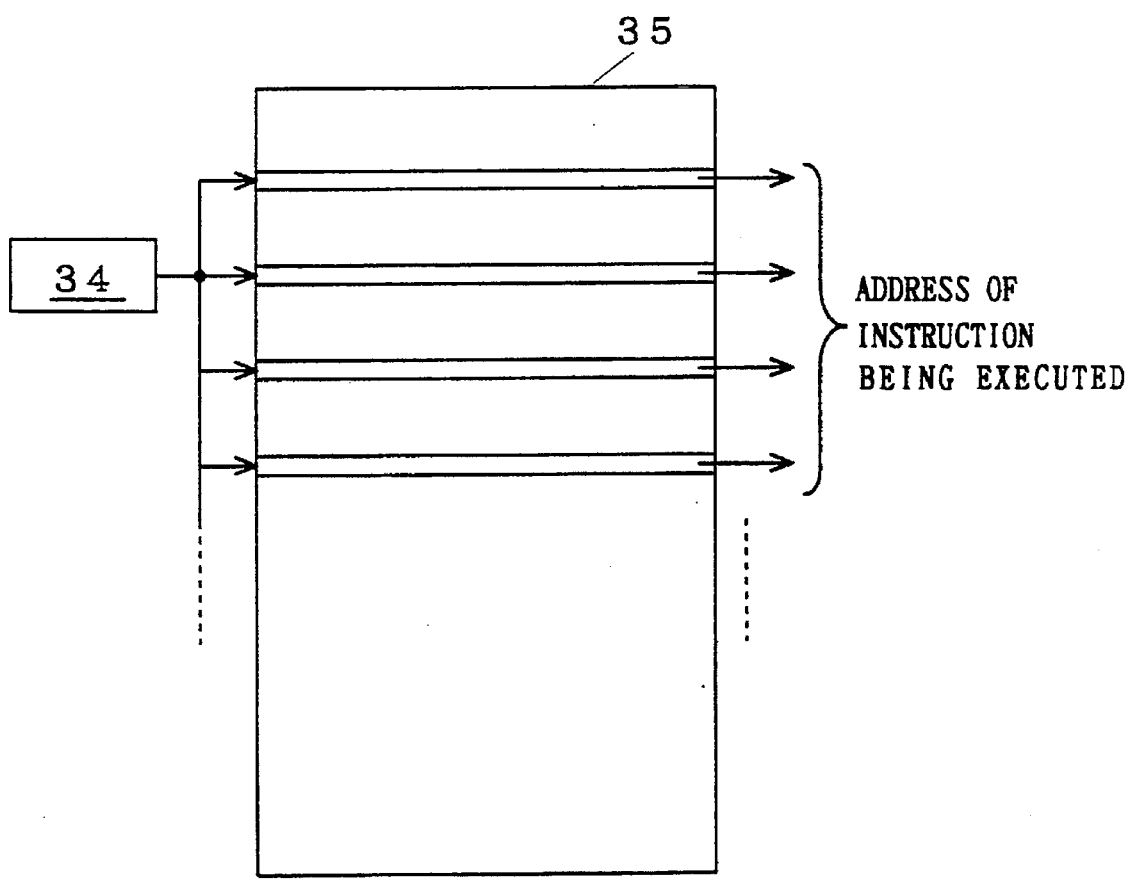

FIG. 16 notionally illustrates an eleventh preferred embodiment according to the present invention. The eleventh preferred embodiment describes the program 302a including virtual system calls 44, 46. The virtual system calls have functions corresponding to the functions of the commands for specifying the start and end of performance evaluation of the program described in the ninth preferred embodiment.

Only an instruction located in an area 45 between the virtual system calls 44 and 46 is simulated by the simulator 100, and the cumulative clock cycle count required for execution of the instruction is correctly determined. For instructions located in other areas 43, 47, it is not necessary to correctly determine the cumulative clock cycle count required for execution thereof and simulation is executed using the simulator 200.

The execution of simulation in this manner allows high-speed simulation execution with correct determination of the cumulative clock cycle count required for execution of the instruction specified using the virtual system calls so that the area of the instruction is located between the virtual system calls.

While the invention has been shown and described in detail, the foregoing description is in all aspects illustrative and not restrictive. It is therefore understood that numerous modifications and variations can be devised without departing from the scope of the invention.

What is claimed is:

1. A method of evaluating a data processing rate of a program by means of simulation, wherein said data processing rate is a rate at which said program is executed in a data processor operating in response to a simulated clock, said program including a plurality of instructions, said method comprising the steps of:

(I) performing a first simulation of an operation of a data processor, said step (I) including the steps of:
   a) performing said first simulation of said program in response to a simulated clock, and
   (b) holding, at addresses corresponding to each of said plurality of instructions, an execution count and a clock cycle count of said simulated clock required for execution of each of said plurality of instructions in said first simulation,
   said step (a) including the steps of:
     (a-1) holding a first instruction and a second instruction of said plurality of instructions executed in said first simulation, wherein said second instruction succeeds said first instruction in said program and where said second instruction is executed in said first simulation after execution of said first instruction is terminated; and
     (a-2) updating said first and second instructions held in said step (a-1) by updating and executing an instruction of said program in said first simulation,
   said step (b) including the steps of:
     (b-1) incrementing by one said execution count held in the address corresponding to said first instruction held in said step (a-1) each time execution of said first instruction is terminated; and
     (b-2) cumulatively adding a clock cycle count required for execution of said first instruction in said first simulation to said clock cycle count held in association with the address corresponding to said first instruction held in said step (a-1) each time execution of said first instruction is terminated,
   said step (a) further including the step of:
     (a-3) replacing said first instruction held in said step (a-1) with said second instruction after said steps (b-1) and (b-2).

2. The method of claim 1, wherein said step (b) further includes the steps of:
   (b-3) generating said simulated clock in said first simulation;
   (b-4) counting said simulated clock to determine a clock cycle count required for execution of said first instruction; and
   (b-5) resetting said clock cycle count counted in said step (b-4) after said step (b-2).

3. The method of claim 1, wherein
said plurality of instructions form a subprogram in said program, and
said step (I) of performing said first simulation further includes the steps of:
   (c) determining a clock cycle count required for execution of each of said plurality of instructions forming said subprogram in said first simulation on the basis of said steps (a) and (b);
   (d) determining an execution count of said subprogram in said first simulation;
   (e) calculating a sum of clock cycle counts required for execution of said plurality of instructions forming said subprogram in said first simulation; and
   (f) dividing said sum calculated in said step (e) by said execution count determined in said step (d) to determine an average clock cycle count required for execution of at least one of said plurality of instructions forming said subprogram in said first simulation.

4. The method of claim 3, wherein
said subprogram is a basic block to be executed continuously from a first subprogram instruction to a last subprogram instruction, and
said step (d) includes the step of
   (d-1) determining an execution count of said basic block in said first simulation from an execution count of any one of said plurality of instructions forming said basic block in said first simulation.

5. The method of claim 2, wherein
a clock cycle count required for execution of at least one of said plurality of instructions in an ideal state is stored as an ideal clock cycle count, and
said step (I) of performing said first simulation further includes the steps of:
   (c) determining, from said steps (a) and (b), an execution count of an instruction for which said ideal clock cycle count is known in said first simulation;
   (d) determining, from said steps (a) and (b), a clock cycle count required for execution of the instruction for which said ideal clock cycle count is known in said first simulation;
   (e) multiplying said ideal clock cycle count by said execution count determined in said step (c) to determine an ideal execution clock cycle count; and
   (f) comparing said clock cycle count determined in said step (d) with said ideal execution clock cycle count.

6. The method of claim 1, further comprising the steps of:
(II) performing a second simulation for virtually implementing an internal state of said data processor after the execution of each of said plurality of instructions; and
(III) performing control for continuously simulating a state in which said program is executed in said data processor by a selected one of said first simulation and said second simulation,
wherein a storage area for use in said first simulation and said second simulation is shared therebetween.

7. The method of claim 6, wherein said step (III) of performing control includes the steps of:
   (c) recognizing a next instruction of said plurality of instructions which is to be simulated after one of said plurality of instructions which is being simulated; and
   (d) selectively performing one of said step (I) of performing said first simulation and said step (II) of performing said second simulation in response to the next instruction recognized in step (c).

8. The method of claim 7, wherein said next instruction is a function.

9. The method of claim 7, wherein
said next instruction to be simulated is stored in an array in each of said first simulation and said second simulation.

10. The method of claim 6, wherein:
said data processor includes
(x-1) a visible register with which said program is permitted to be directly associated, and
(x-2) an invisible register with which said program is not permitted to be directly associated;
said step (I) of performing said first simulation further includes the steps of
(c) holding a contents of said visible register, and
(d) holding a contents of said invisible register;
said step (II) of performing said second simulation includes the step of (e) holding the contents of said visible register; and
said step (III) of performing control includes the step of
(f) resetting the contents held in said step (d) of said first simulation when operation of said data processor is simulated by said first simulation in response to one of said plurality of instructions after operation of said data processor is simulated by said second simulation in response to another one of said plurality of instructions.

11. The method of claim 6, wherein said step III) of performing control includes the steps of:

(c) causing a first type command entered immediately after an interrupt of said first simulation to perform said first simulation upon an instruction to be simulated after the interrupt of said first simulation; and
(d) causing a second type command entered immediately after an interrupt of said second simulation to perform said second simulation upon an instruction to be simulated after the interrupt of said second simulation.

12. The method of claim 6, wherein
said plurality of instructions are classified into a specific instruction and an unspecified instruction, and
said step (III) of performing control includes the steps of:
(c) performing said first simulation upon said unspecified instruction; and
(d) performing said second simulation upon said specific instruction.

13. The method of claim 6, wherein
said plurality of instructions further include first and second virtual system calls, said first virtual system call preceding said second virtual system call, and
said step (III) of performing control includes the steps of:
(c) performing said first simulation upon at least one of said plurality of instructions which is located between said first and second virtual system calls; and
(d) performing said second simulation upon at least one of said plurality of instructions which precedes said first virtual system call and at least one of said plurality of instructions which succeeds said second virtual system call.

* * * * *